(12) United States Patent
Nakamura

(10) Patent No.: US 10,031,704 B2
(45) Date of Patent: Jul. 24, 2018

(54) PRINTING SYSTEM PROCESSING DATA ACCORDING TO AUTHENTICATION INFORMATION, PRINTING APPARATUS AND PORTABLE TERMINAL CONSTITUTING THE SYSTEM, CONTROL METHODS THEREFOR, AND STORAGE MEDIUM STORING CONTROL PROGRAMS THEREFOR

(71) Applicant: CANON KABUSHIKI KAISHA, Tokyo (JP)

(72) Inventor: Tadahiro Nakamura, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/831,297

(22) Filed: Aug. 20, 2015

(65) Prior Publication Data
US 2016/0054955 A1 Feb. 25, 2016

(30) Foreign Application Priority Data
Aug. 25, 2014 (JP) .................................. 2014-170569

(51) Int. Cl.
*G06F 15/00* (2006.01)
*G06F 3/12* (2006.01)
*G06K 15/00* (2006.01)

(52) U.S. Cl.
CPC .......... *G06F 3/1204* (2013.01); *G06F 3/1222* (2013.01); *G06F 3/1238* (2013.01);
(Continued)

(58) Field of Classification Search
CPC .... G06F 3/1238; G06F 3/1222; G06F 3/1204; G06F 3/1292; G06K 15/4095
(Continued)

(56) References Cited

U.S. PATENT DOCUMENTS

2009/0103124 A1* 4/2009 Kimura ................. G06F 3/1204
358/1.15
2011/0279847 A1 11/2011 Kakoi et al.
2014/0320874 A1* 10/2014 Tredoux ............. G06K 15/4095
358/1.13

FOREIGN PATENT DOCUMENTS

| CN | 102200896 A | 9/2011 |
|---|---|---|
| JP | 2013257687 A | 12/2013 |
| KR | 10-2008-0038450 A | 5/2008 |

OTHER PUBLICATIONS

Korean Office Action issued in Application No. 10-2015-0118540 dated Dec. 15, 2017.
(Continued)

*Primary Examiner* — Saeid Ebrahimi Dehkord
(74) *Attorney, Agent, or Firm* — Rossi, Kimms & McDowell LLP

(57) ABSTRACT

A printing system that is capable of saving time for inputting authentication information at the time of instructing job process from the portable terminal. A printing system comprises a printing apparatus and a portable terminal. The printing apparatus comprises an NFC tag, an authentication unit, a writing unit that writes data including user information about a user whose authentication succeeds into the NFC tag when the user authentication succeeds, a reception unit that receives print data, and a processing unit that processes the print data based on the user information included in the print data received. The portable terminal comprises a reading unit that read data from the NFC tag, an extraction unit that extracts the user information from the data read, a generation unit that generates print data using the user information extracted, and a transmission unit that transmits the print data generated to the printing apparatus.

19 Claims, 19 Drawing Sheets

(52) U.S. Cl.
CPC ....... *G06F 3/1292* (2013.01); *G06K 15/4095* (2013.01); *G06F 3/1236* (2013.01)

(58) Field of Classification Search
USPC .............................................. 358/1.13–1.15
See application file for complete search history.

(56) References Cited

OTHER PUBLICATIONS

Chinese Office Action issued in Application No. 201510523059.3 dated Dec. 4, 2017. English translation provided.

* cited by examiner

| SIGN 650 | RECORD NAME 651 | VALUE 652 |
|---|---|---|
| 612 | <NETWORK INFORMATION><br>IP ADDRESS<br>MAC ADDRESS<br>UUID | 192.168.0.1<br>00:00:85:12:34:56<br>12345678-1234-1234-1234-1234567890ab |
| 614 | <USER INFORMATION><br>USER ID | user1 |

PRINTING SYSTEM PROCESSING DATA ACCORDING TO AUTHENTICATION INFORMATION, PRINTING APPARATUS AND PORTABLE TERMINAL CONSTITUTING THE SYSTEM, CONTROL METHODS THEREFOR, AND STORAGE MEDIUM STORING CONTROL PROGRAMS THEREFOR

BACKGROUND OF THE INVENTION

Field of the Invention

The present invention relates to a technique of processing job processing data like print data etc. according to authentication information that is added to the data.

Description of the Related Art

Job processing apparatuses equipped with various wireless communication functions have appeared in a commercial scene in recent years. For example, there are printing apparatuses equipped with an NFC (Near Field Communication), a wireless LAN, the Bluetooth (registered trademark), an RFID (Radio Frequency Identification), etc. Such a printing apparatus is able to print easily according to an instruction from a portable terminal like a smart phone that similarly supports the NFC. A printing apparatus supporting the NFC has an IC chip called an NFC tag that holds various kinds of information needed for a portable terminal to connect with the printing apparatus and to use the printing apparatus. The information is written into the NFC tag in an NDEF (NFC Data Exchange Format) defined by the NFC forum. For example, the printing apparatus writes the pieces of information, such as an IP address, a URL, a printer name, and an installation location, into the NFC tag. When reading the NFC tag of the printing apparatus with the portable terminal, a user becomes possible to instruct the printing apparatus to print from the portable terminal.

Moreover, the printing apparatus is able to extract user information included in print data received from a portable terminal, a PC (personal computer), etc., and is able to perform a process for a specific user according to the user information. For example, the printing apparatus can permit color printing only to a specific user, or can manage print counts for respective users by totaling print logs for the respective users.

Japanese Laid-Open Patent Publication (Kokai) No. 2013-257687 (JP 2013-257687A) discloses a technique that allows a portable terminal to read information from an NFC tag into which the information about processes, such as printing and scanning, that are executable by a printing apparatus, and to transmit a process execution request. When transmission of the process execution request requires authentication information, a user inputs the authentication information with the portable terminal before transmission.

Moreover, there is a known technique that manages processes also including a copy of a paper sheet operated through an operation panel of a printing apparatus for every user by making a printing apparatus provide an authentication function and requiring a user to log in to the printing apparatus. There are two methods for a user to log in to a printing apparatus including a method of inputting a user name and a password through an operation panel of a printing apparatus, and a method of touching an IC card into which user information has been written to a card reader of a printing apparatus. The method using an IC card to log in is used widely because there is no troublesomeness to input a user name and a password every time.

However, when printing is instructed from a portable terminal, user information may not be included in print data. This is because a portable terminal is personally used by an individual in general. Since a portable terminal does not have information about a user name etc. for identifying a user who currently uses it, user information cannot be included in print data. When user information is not included in print data, a process for a specific user mentioned above cannot be performed because a user who instructs to print cannot be specified.

In order to solve the problem, the above-mentioned publication discloses a technique to allow a user to input authentication information separately on a portable terminal so that user information can be included in print data. In the environment where a user can log in to a printing apparatus with an IC card, a user is not required to input authentication information at the time of login. However, even if a user logged in with an IC card, the user is required to input authentication information separately on a portable terminal when the user instructs to print from the portable terminal, which takes time and is inconvenient.

SUMMARY OF THE INVENTION

The present invention provides a printing system, a printing apparatus and a portable terminal constituting the printing system, control methods therefor, and storage mediums storing control programs therefor, which are capable of saving time for inputting authentication information at the time of instructing job process from the portable terminal.

Accordingly, a first aspect of the present invention provides a printing system comprising a printing apparatus comprising an NFC tag, an authentication unit configured to execute user authentication, a writing unit configured to write data that includes user information about a user whose authentication succeeds into the NFC tag when the user authentication succeeds, a reception unit configured to receive print data, and a processing unit configured to process the print data based on the user information included in the print data received by the reception unit, and a portable terminal comprising a reading unit configured to read data written in the NFC tag from the NFC tag, an extraction unit configured to extract the user information from the data read by the reading unit, a generation unit configured to generate print data using the user information extracted by the extraction unit, and a transmission unit configured to transmit the print data generated by the generation unit to the printing apparatus.

Accordingly, a second aspect of the present invention provides a printing apparatus comprising an NFC tag, an authentication unit configured to execute user authentication, a writing unit configured to write data that includes user information about a user whose authentication succeeds into the NFC tag when the user authentication succeeds, a reception unit configured to receive print data transmitted from an external apparatus, and a processing unit configured to process the print data based on the user information included in the print data received by the reception unit.

Accordingly, a third aspect of the present invention provides a portable terminal comprising a reading unit configured to read data in an NFC tag from the NFC tag, a determination unit configured to determine whether the data read from the NFC tag includes user information, a generation unit configured to generate print data using the user information when the determination unit determines that the data includes the user information, and a transmission unit configured to transmit the print data generated by the generation unit.

Accordingly, a fourth aspect of the present invention provides a control method for a printing apparatus with an NFC tag, the control method comprising an authentication step of executing user authentication, a writing step of writing data that includes user information about a user whose authentication succeeds into the NFC tag when the user authentication succeeds, a receiving step of receiving print data transmitted from an external apparatus, and a processing step of processing the print data based on the user information included in the print data received in the receiving step.

Accordingly, a fifth aspect of the present invention provides a non-transitory computer-readable storage medium storing a control program causing a computer to execute the control method of the fourth aspect.

Accordingly, a sixth aspect of the present invention provides a control method for a portable terminal that reads data from an NFC Tag, the control method comprising a determining step of determining whether the data read from the NFC tag includes user information, a generating step of generating print data using the user information when it is determined that the data includes the user information in the determining step, and a control step of controlling the portable terminal so as to transmit the print data generated in the generating step.

Accordingly, a seventh aspect of the present invention provides a non-transitory computer-readable storage medium storing a control program causing a computer to execute the control method of the sixth aspect.

According to the present invention, time for inputting authentication information at the time of instructing job process from the portable terminal is saved.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
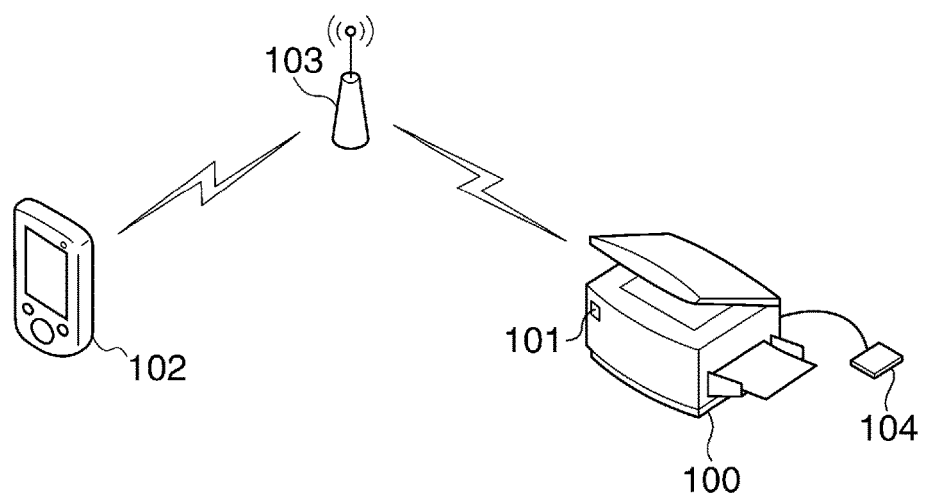
FIG. 1 is a view showing an example of a configuration of a job processing system including a printing apparatus according to a first embodiment of the present invention.

FIG. 1 is a view showing an example of a configuration of a job processing system including a printing apparatus according to a first embodiment of the present invention.

This job processing system includes a printing apparatus 100 as a job processing apparatus, an access point 103, a portable terminal 102, and a card reader 104. Although the card reader 104 in FIG. 1 is separated from the printing apparatus 100, it may be united. Moreover, the portable terminal 102 is an example of a terminal that executes a print application 505 (FIG. 5) mentioned later. A part of functions of the job processing system is approximately borne by the print application 505 and is not borne by the portable terminal itself. The print application 505 has been provided to the portable terminal 102 beforehand through a communication or a storage medium, and is installed and executed in the portable terminal 102.

The printing apparatus 100 has an NFC (Near Field Communication) tag 101, and various kinds of information are written in the NFC tag 101. The card reader 104 is connected to the printing apparatus 100. A user is able to log in to the printing apparatus 100 by holding a user's own IC card over the card reader 104. The portable terminal 102 has an NFC reader function, and reads the information written in the NFC tag 101 by bringing the portable terminal 102 close to the NFC tag 101. The printing apparatus 100 and the portable terminal 102 communicate mutually through the access point 103. The portable terminal 102 transmits a job (for example, a print job) to the printing apparatus 100, and the printing apparatus 100 analyzes and prints the received print job.

Figure 2:
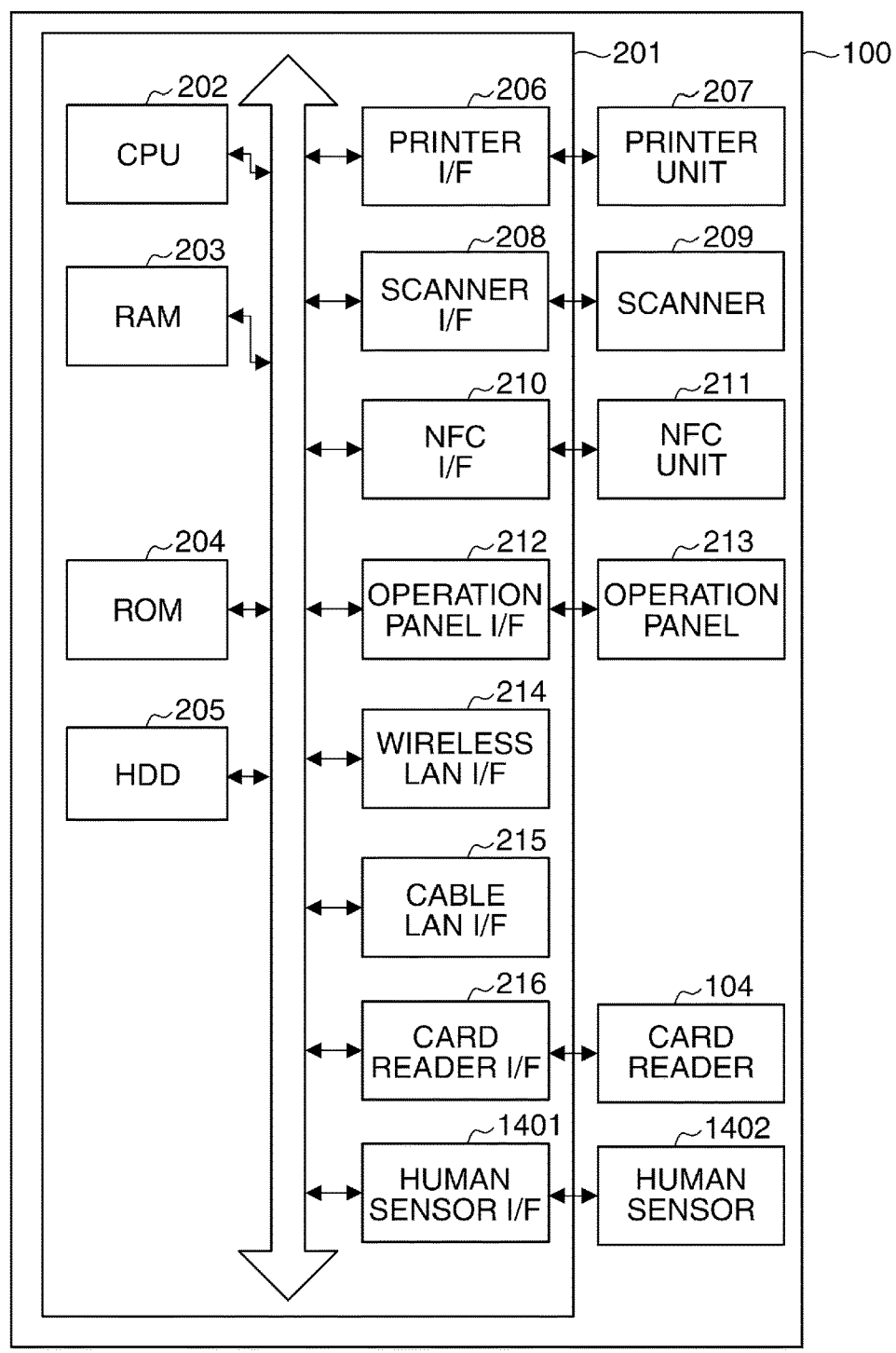
FIG. 2 is a block diagram schematically showing a hardware configuration of the printing apparatus shown in FIG. 1.

FIG. 2 is a block diagram schematically showing a hardware configuration of the printing apparatus 100.

Although the printing apparatus 100 is described as a multifunctional peripheral device equipped with a scanner in the first embodiment, the printing apparatus 100 may be a printer that is not provided with a scanner.

A control unit 201 including a CPU 202 controls operations of the entire printing apparatus 100. The CPU 202 reads a control program stored in a ROM 204, and performs various kinds of control like communication control, etc. A RAM 203 is used as a main memory of the CPU 202 and a temporary area such as a work area. An HDD 205 stores data, various programs, and various information tables.

A printer I/F 206 connects a printer unit 207 as a printer engine with the control unit 201. The printer unit 207 executes a printing process to a sheet fed from a sheet cassette (not shown) according to print data input through the printer I/F 206. At this time, the printer unit 207 functions as a processing unit of the present invention. A scanner I/F 208 connects a scanner 209 with the control unit 201. The scanner 209 reads a placed original, and then generates image data. The image data that is generated by the scanner 209 is printed by the printer unit 207, is stored into the HDD 205, or is transmitted to an external apparatus through a wireless LAN I/F 214 or a cable LAN I/F 215.

An NFC I/F 210 connects an NFC unit 211 with the control unit 201. The NFC unit 211 holds NDEF (NFC Data Exchange Format) data passed from the control unit 201 through the NFC I/F 210. Then, the NFC unit 211 outputs and transmits the NDEF data held to the portable terminal 102, when the portable terminal 102 is located within an NFC communication area. Accordingly, the portable terminal 102 is able to read the NDEF data from the NFC tag 101.

An operation panel I/F 212 connects an operation panel 213 with the control unit 201 as a reception unit. The operation panel 213 is provided with a liquid-crystal-display section having a touch-panel function, a keyboard, various function keys, etc. A user checks a screen displayed on the operation panel 213, and inputs various instructions to the printing apparatus 100 using a touch panel. The wireless LAN I/F 214 executes wireless communications with external information processing apparatuses, such as a portable terminal and a PC. According to the wireless communications, the printing apparatus 100 receives the print data from an information processing apparatus, and the printer unit 207 executes a printing process on the basis of the received print data. Moreover, the printing apparatus 100 is able to transmit image data generated by the scanner 209 to an external information processing apparatus through the wireless LAN I/F 214. The cable LAN I/F 215 communicates with an external information processing apparatus (not shown) through a LAN cable (not shown).

A card reader I/F 216 connects the card reader 104 with the control unit 201. When an IC card (not shown) is located within a communication area, the card reader 104 reads information from the IC card and transmits it to the control unit 201. Although the printing apparatus 100 shall execute process shown in flowcharts mentioned below using one CPU (the CPU 202) and one memory (the RAM 203), another configuration may be employed. For example, the flowcharts mentioned below may be executed by operating a plurality of CPUs and a plurality of memories cooperatively.

It should be noted that FIG. 2 is used also for describing a second embodiment. Accordingly, a human sensor 1402 and a human sensor I/F 1401 that are employed by the second embodiment but are not indispensable to the first embodiment are illustrated. Function of these will be described in the second embodiment.

Figure 3:
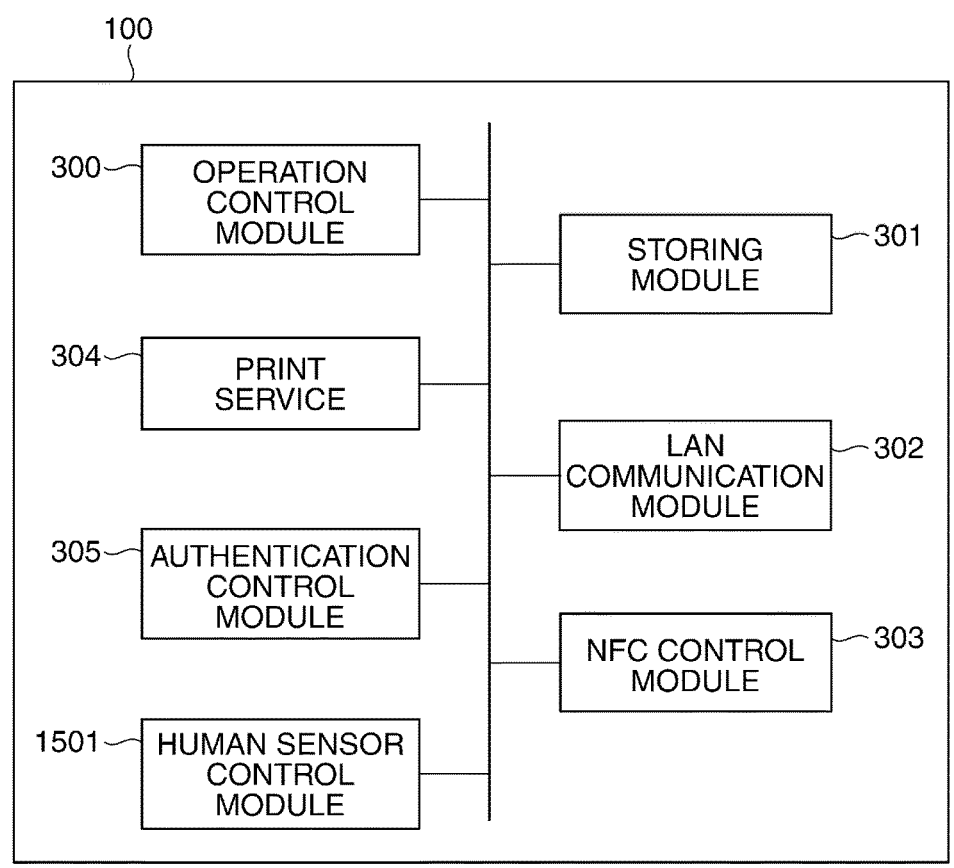
FIG. 3 is a block diagram schematically showing a software configuration of the printing apparatus shown in FIG. 1.

FIG. 3 is a block diagram schematically showing a software configuration of the printing apparatus 100. Function modules shown in FIG. 3 are achieved when the CPU 202 executes control programs stored in the ROM 204 or the HDD 205.

An operation control module 300 controls the operation panel 213. For example, the operation control module 300 displays an operation screen on the operation panel 213, or receives a user's instruction inputted through the displayed operation screen. Moreover, the operation control module 300 notifies other function modules of the received user's instruction, and updates the displayed operation screen according to the received user's instruction. A storing module 301 stores designated data to the RAM 203 or the HDD 214 according to an instruction from another module, or reads stored data. A LAN communication module 302 controls LAN communications that the wireless LAN I/F 214 or the cable LAN I/F 215 executes. An NFC control module 303 (a control unit) controls the NFC unit 211 through the NFC I/F 210.

A print service 304 communicates with the print application 505 (FIG. 5) through the LAN communication, etc., and receives print data from the print application 505 (it may be referred to as "the application 505"). Then, when the received print data is based on a protocol format that is supported by the print service 304, the print service 304 outputs the print data concerned to the printer unit 207 through the printer I/F 206. In this embodiment, the print service 304 supports an IPP (Internet Printing Protocol) as a protocol format. In addition, it may support a plurality of other protocol formats, such as an LPR.

An authentication control module 305 (an authentication unit) executes authentication control on the basis of the information that the card reader 104 read from the IC card. Specifically, the authentication control module 305 compares the user information read from the IC card with the user DB (database) stored in the HDD 205, and specifies a user, a user permission, etc. In addition, the authentication control module 305 makes the liquid crystal display unit of the operation panel 213 display an operation screen corresponding to the specified user.

It should be noted that FIG. 3 is used for describing a second embodiment. Accordingly, a human sensor control module 1501 that is employed in the second embodiment but is not indispensable to the first embodiment is illustrated. A function of this will be described in the second embodiment.

Figure 4:
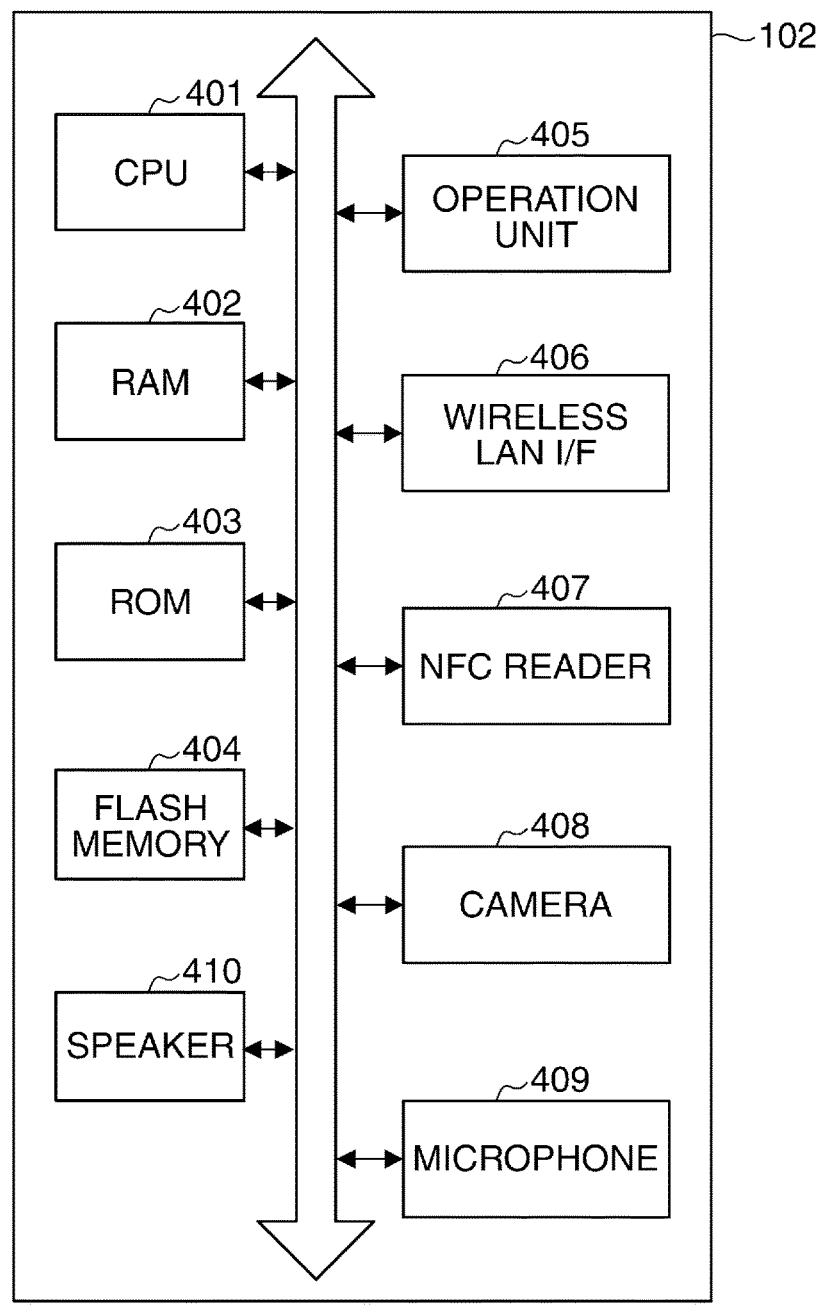
FIG. 4 is a block diagram schematically showing a hardware configuration of a portable terminal shown in FIG. 1.

FIG. 4 is a block diagram schematically showing a hardware configuration of the portable terminal 102. A CPU 401 reads a control program stored in a ROM 403, and controls the entire portable terminal 102. A RAM 402 is used as a main memory of the CPU 401 and a temporary area such as a work area. A flash memory 404 stores data, various programs, and various information tables.

An operation unit 405 consists of a liquid crystal display unit having a touch panel function and hard keys. A user checks a screen displayed on the operation unit 405, and inputs various instructions to the portable terminal 102 using the touch panel. A wireless LAN I/F 406 executes wireless communications with external information processing apparatuses, such as a printing apparatus 100. The wireless LAN I/F 406 is able to transmit image data stored in memories, such as the flash memory 404, as print data to the printing apparatus 100, for example.

An NFC reader 407 reads NDEF data from the NFC tag of external apparatuses, such as the printing apparatus 100. The NDEF data is read when the NFC reader 407 of the portable terminal 102 is located within the NFC communication area of the NFC tag in the printing apparatus 100. It should be noted that the NFC communication area covers distance from several centimeters to about 10 cm, in general. Accordingly, when a user tries to read NDEF data, the user usually holds the NFC reader 407 of the portable terminal 102 over the NFC tag or touches the NFC tag with the NFC reader 407.

A camera 408 includes a lenses and an image pickup device that are built in the portable terminal 102, and photographs a movie and a static image. A microphone 409 receives a user's voice input, when the user uses the portable terminal 102 to talk with another portable terminal's user, for example. A speaker 410 delivers sound received from another portable terminal, when a user uses the portable terminal 102 to talk with another portable terminal's user, for example. Although the portable terminal 102 shall execute process shown in flowcharts mentioned below using one CPU (the CPU 401) and one memory (the RAM 402), another configuration may be employed. For example, the flowcharts mentioned below may be executed by operating a plurality of CPUs and a plurality of memories cooperatively.

Figure 5:
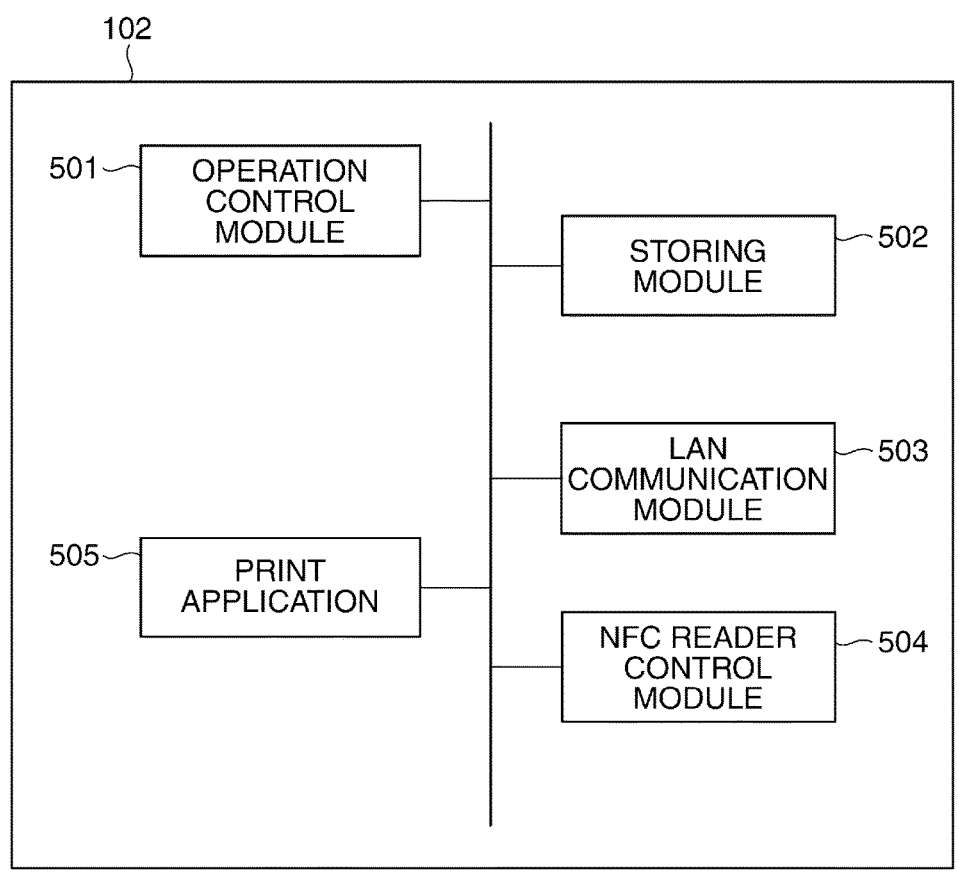
FIG. 5 is a block diagram schematically showing a software configuration of the portable terminal shown in FIG. 1.

FIG. 5 is a block diagram schematically showing a software configuration of the portable terminal 102. Function modules shown in FIG. 5 are achieved when the CPU 401 executes control programs stored in the ROM 403 or the flash memory 404.

An operation control module 501 controls the operation unit 405. For example, the operation control module 501 displays an operation screen on the operation unit 405, or receives a user's instruction inputted through the displayed operation screen. Moreover, the operation control module 501 notifies other function modules of the received user's instruction, and updates the displayed operation screen according to the received user's instruction. A storing module 502 stores designated data to the RAM 402 or the flash memory 404 according to an instruction from another module, or reads stored data. A LAN communication module 503 controls LAN communications that the wireless LAN I/F 406 executes. An NFC reader control module 504 controls the NFC reader 407. The application 505 communicates with the print service 304 on the printing apparatus 100 through LAN communications, etc., and transmits print data in a protocol format supported by the print service 304. The application 505 may be installed at the time of shipment of the portable terminal 102, or may be obtained and installed by downloading etc.

Figures 6A, 6B:
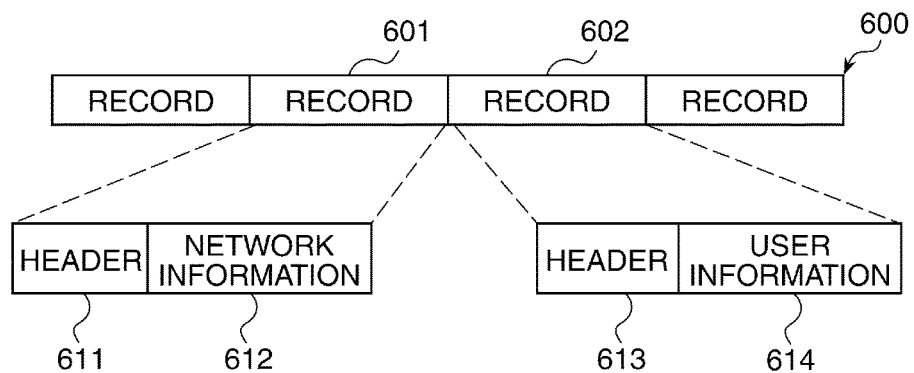
FIG. 6A is a view showing an example of NDEF data held in an NFC unit shown in FIG. 2.
FIG. 6B is a view showing examples of information (setting values) described in each record of the NDEF data shown in FIG. 6A.

FIG. 6A is a view showing an example of the NDEF data held in the NFC unit 211. The NFC unit 211 that holds the NDEF data becomes the NFC tag 101. Various kinds of information about the printing apparatus 100 are described in the NDEF data 600 in the NDEF. The NDEF data 600 is constituted by a plurality of records, and includes at least a record 601 in which network information about the printing apparatus 100 is described. Furthermore, the NDEF data 600 can include a record 602 in which information about a user who uses the printing apparatus 100 is described.

The record 601 consists of a header 611 and network information 612. The header 611 stores the information indicating that the record 601 stores the network information in the format defined by the NFC forum. The network information 612 stores information on which the application 505 specifies the printing apparatus 100 on the network. The network information 612 stores an IP address, MAC address, UUID, etc. given to the printing apparatus 100, for example.

The record 602 consists of a header 613 and user information 614. The header 613 stores the information indicating that the record 602 stores the user information in the format defined by the NFC forum. The user information 614 stores the information about a user at the time when the application 505 uses the printing apparatus 100. The user information 614 includes a user ID etc., for example.

It should be noted that the NDEF data 600 may include records other than the records 601 and 602. For example, the NDEF data 600 may include a record that describes information for starting an application on the portable terminal 102, or a record that describes device information, such as a manufacture vendor name, a model name, and an installation location, about the printing apparatus 100.

FIG. 6B is a view showing examples of information (setting values) described in each record of the NDEF data 600. A value in a sign column 650 corresponds to a sign in FIG. 6A. A record name and an item(s) of recorded information are described as values in a record name column 651. A value(s) corresponding to the item(s) is described in a value column 652.

Figure 7A:
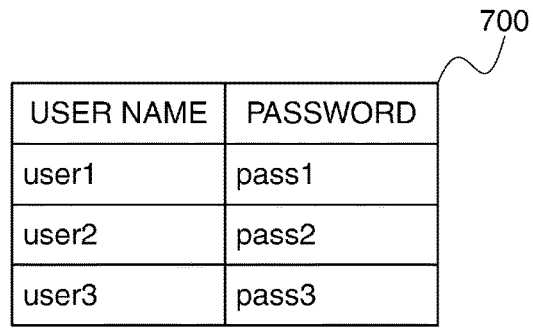
FIG. 7A, FIG. 7B, and FIG. 7C are views showing an authentication DB, a permission DB, and a counter DB, respectively as examples of user databases that an authentication control module shown in FIG. 3 manages.
Figure 7B:
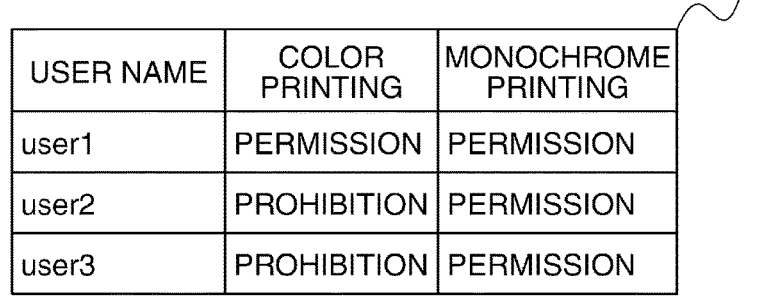
Figure 7C:
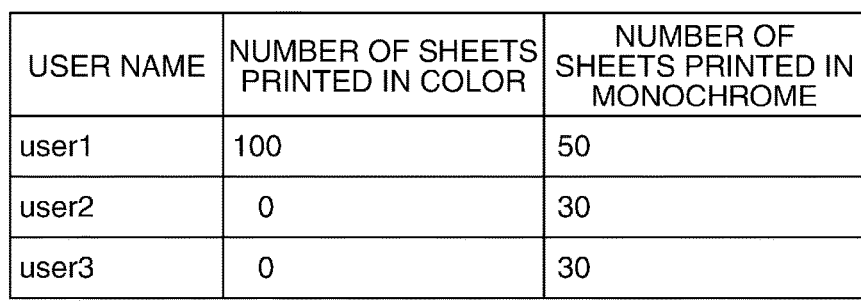

FIG. 7A, FIG. 7B, and FIG. 7C are views showing examples of a user DB that are managed by the authentication control module 305. The user DB consists of an authentication DB 700 (FIG. 7A), a permission DB 710 (FIG. 7B), and a counter DB 720 (FIG. 7C).

The authentication DB 700 (FIG. 7A) has a plurality of tuples each of which consists of a user name and a password. In the case of the authentication with the IC card, the authentication control module 305 authenticates the user by the user name only. When the user name read from the IC card exists in the authentication DB 700, the authentication succeeds. In the case of the authentication with the operation panel 213, the authentication control module 305 determines that the authentication succeeds, when the tuple of the user name and the password exists in the authentication DB 700. A list of users and functions that are executable by the respective users is set in the permission DB 710 (FIG. 7B). The permission DB 710 defines whether color printing and monochrome printing are permitted to the respective users. The counter DB 720 (FIG. 7C) stores information about how many sheets are used in the color printing and the monochrome printing for the respective users up to the present.

Although only the color printing and the monochrome printing are shown as the information managed in the permission DB 710 and the counter DB 720 in the first embodiment, permission/prohibition settings about other various functions of the printing apparatus 100 may be managed.

Figure 8A:
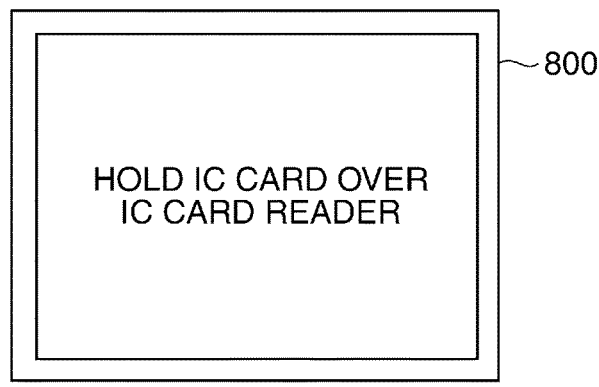
FIG. 8A, FIG. 8B, and FIG. 8C are views showing screen examples displayed at the time when a user logs in to the printing apparatus shown in FIG. 1.
Figure 8B:
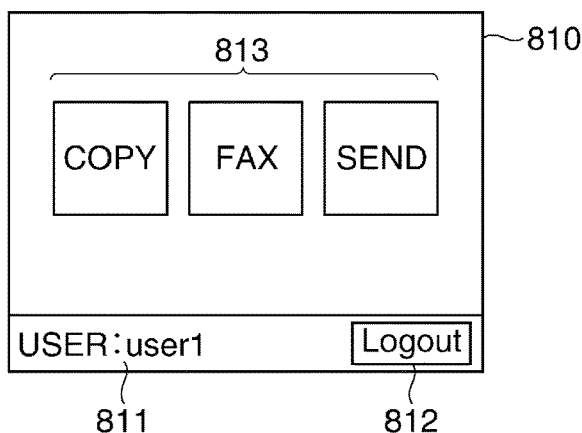
Figure 8C:
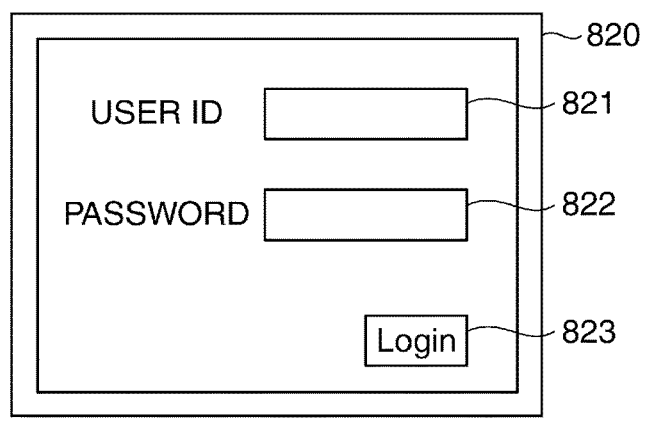

FIG. 8A, FIG. 8B, and FIG. 8C are views showing screen examples displayed at the time when a user logs in to the printing apparatus 100. These screens are displayed on the liquid crystal display unit of the operation panel 213.

First, a screen 800 displayed in the case of authentication by the IC card is shown in FIG. 8A. The screen 800 is displayed before login. When a user holds the IC card over the card reader 104, an authentication process is executed and an operation screen 810 as shown in FIG. 8B is displayed. The operation screen 810 after the authentication is shown in FIG. 8B. In the operation screen 810, a user name 811 for login, a logout button 812, and a function selection screen 813 exist. Although buttons of COPY, FAX, and SEND are shown in the function selection screen 813, the buttons are not limited to these. When the user depresses the logout button 812 in the operation screen 810, a log-out process is executed and a display returns to the screen 800.

A screen 820 displayed at the time of authentication from the operation panel 213 is shown in FIG. 8C. In the screen 820, when the user respectively inputs a user name and a password into field 821 and 822, and then depresses a login button 823, the authentication process is executed. As a result, the operation screen 810 as shown in FIG. 8B is displayed.

Figure 9:
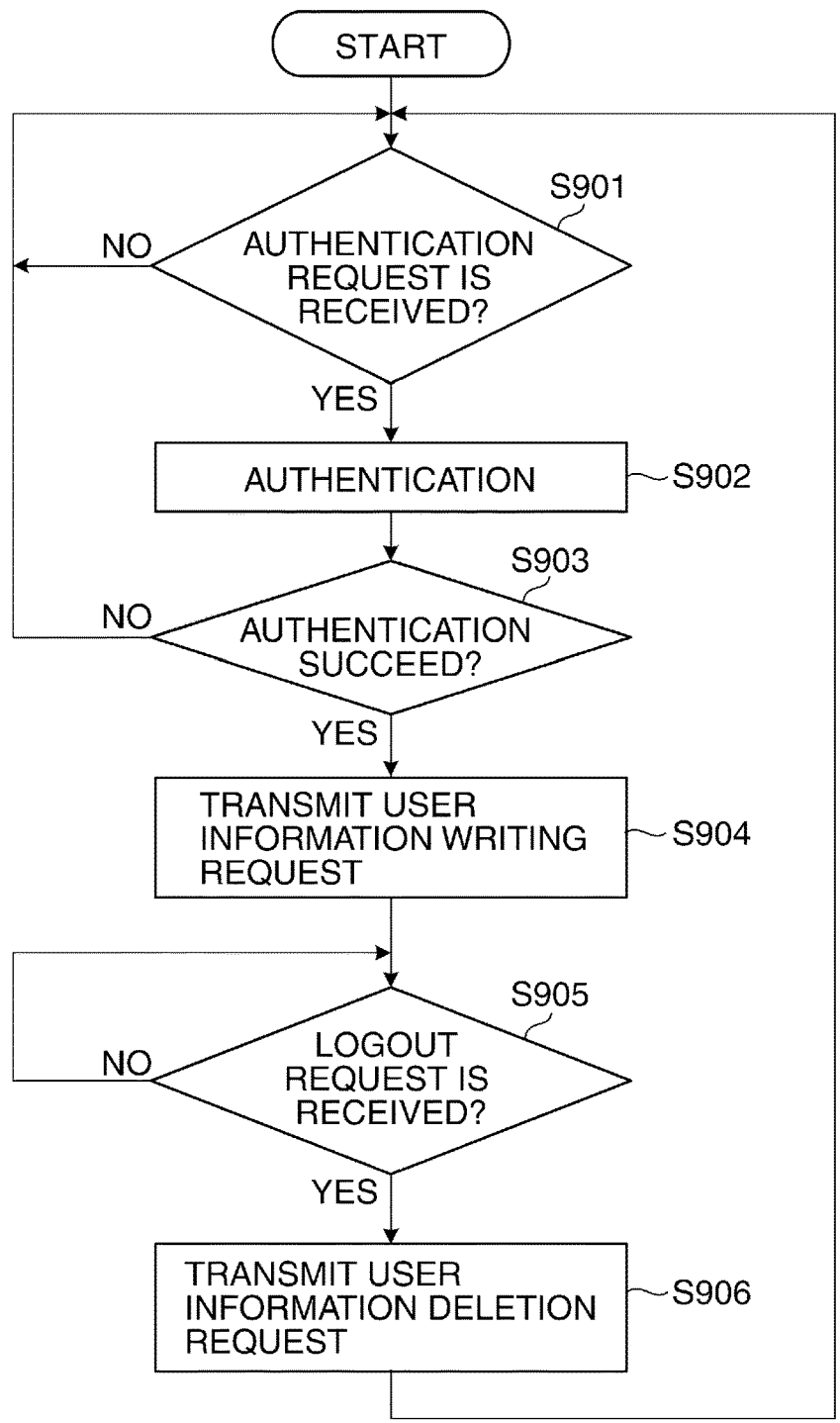
FIG. 9 is a flowchart showing an authentication process executed by the authentication control module shown in FIG. 3.

FIG. 9 is a flowchart showing the authentication process executed by the authentication control module 305. The CPU 202 develops the program stored in a memory, such as the ROM 204 or the HDD 205, to the RAM 203, and executes this process.

First, at step S901, the authentication control module 305 stands by until receiving an authentication request. In the case of the IC card authentication in this state, the authentication request is received when the user holds the IC card over the card reader 104. In the case of the authentication from the operation panel 213, the authentication request is received when the user depresses the login button 823. Next, the authentication control module 305 executes the authentication process in step S902 by comparing the user name read from the IC card or the tuple of the user name and password input by the user with the authentication DB 700.

In step S903, the authentication control module 305 determines whether the authentication succeeded. When the authentication failed, the process returns to the step S901. On the other hand, when the authentication succeeded, the authentication control module 305 transmits a user information writing request to the NFC control module 303 in step S904. At this time, the authentication control module 305 passes the authenticated user information (the user name or the tuple of the user name and the password) to the NFC control module 303. Next, the authentication control module 305 waits until receiving a logout request in step S905. This process is equivalent to a process for detecting a login state. The logout request is transmitted when the user depresses the logout button 812 or a definite period of time passes without operating the operation panel 213 (timeout). When receiving the logout request the authentication control module 305 transmits a user information deletion request to the NFC control module 303 in step S906, and then returns the process to the step S901.

It should be noted that the authentication control module 305 always transmits the requests to the NFC control module 303 at the times of the authentication and logout. However, a request may not be transmitted according to conditions. For example, a user may set about whether the authentication control module 305 transmits a request to the NFC control module 303. In such a case, a request is transmitted only when the user set to transmit a request. Moreover, the printing apparatus 100 may be designed so that a user sets about whether the authentication function is used. In such a case, a request is transmitted only when the user sets that the authentication function is used.

Figure 10:
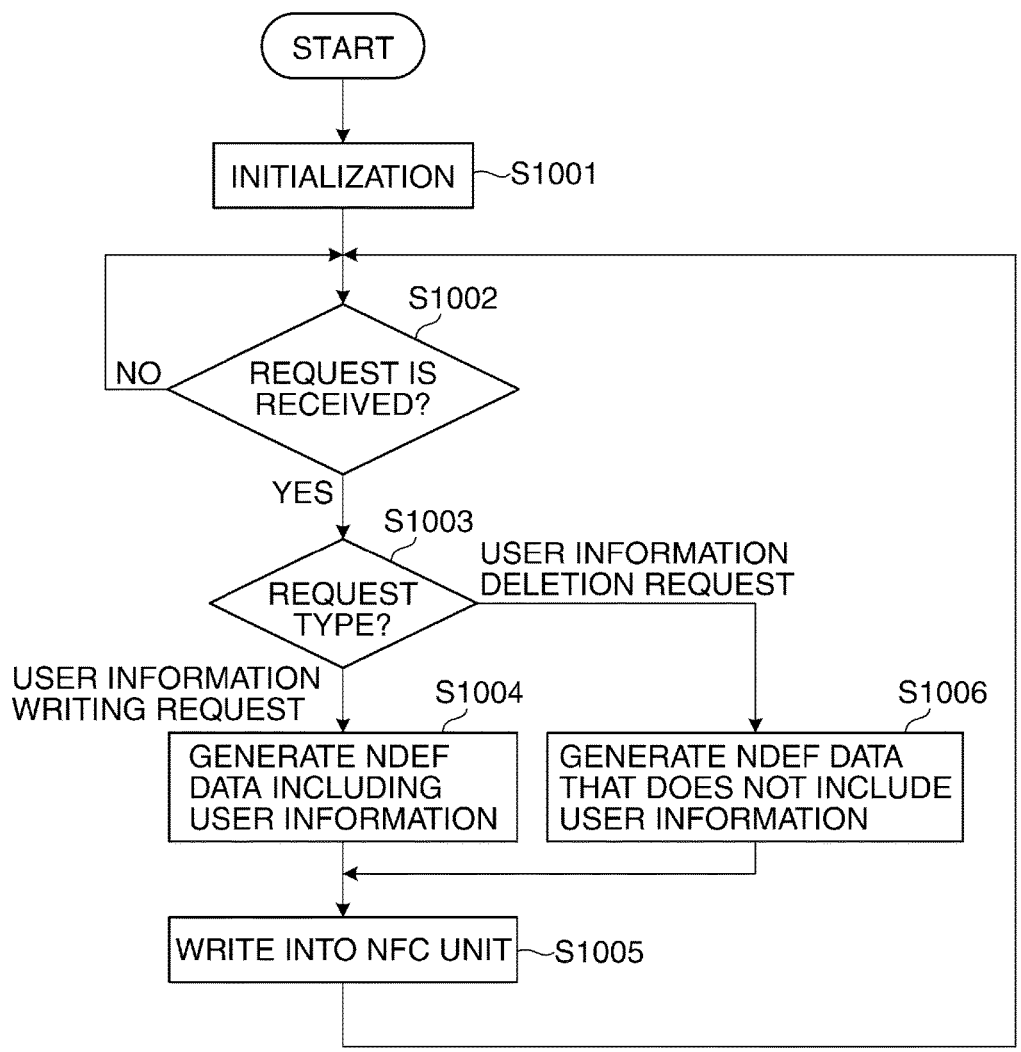
FIG. 10 is a flowchart showing an NDEF data writing process executed by an NFC control module shown in FIG. 3.

FIG. 10 is a flowchart showing an NDEF data writing process executed by the NFC control module 303. The CPU 202 develops the program stored in a memory, such as the ROM 204 or the HDD 205, to the RAM 203, and executes this process.

When the printing apparatus 100 is started, the NFC control module 303 initializes the NFC unit 211 in step S1001. In an initial state, no user has logged in yet. It should be noted that the NFC control module 303 may be configured so as to generate the NDEF data 600 that does not include the user information 614 and to write it into the NFC unit 211 in this step S1001.

In the next step S1002, the NFC control module 303 stands by until receiving a request from another processing module. When receiving a request from the authentication control module 305, the NFC control module 303 determines the type of the request in step S1003. As a result of the determination, when the received request is the user information writing request (it was transmitted in the step S904 in FIG. 9) from the authentication control module 305, the NFC control module 303 generates the NDEF data 600 in step S1004. In that case, the NFC control module 303 gives the record 602 that described the received user name as the user ID of the user information 614 to the NDEF data 600 to generate.

On the other hand, when the received request is the user information deletion request (it was transmitted in the step S906 in FIG. 9) from the authentication control module 305, the NFC control module 303 generates the NDEF data 600 that does not include the user information 641 in step S1006.

In step S1005 after the process in the step S1004 or S1006, the NFC control module 303 writes the generated NDEF data 600 into the NFC unit 211, and returns the process to the step S1002. It should be noted that the NDEF data 600 once written into the NFC unit 211 will be updated to new NDEF data 600 because the process in the steps S1002 through S1005 will be repeated. Accordingly, the NDEF data 600 turns into data that does not include the user information 614, or data including the user information 614. The update of the NDEF data 600 including the user information 614 to the NDEF data 600 that does not include the user information 614 is approximately identical to the deletion of the user information 614 from the NDEF data 600. Accordingly, when the logout is detected, the user information 614 written into the NFC unit 211 is approximately deleted.

Figure 11:
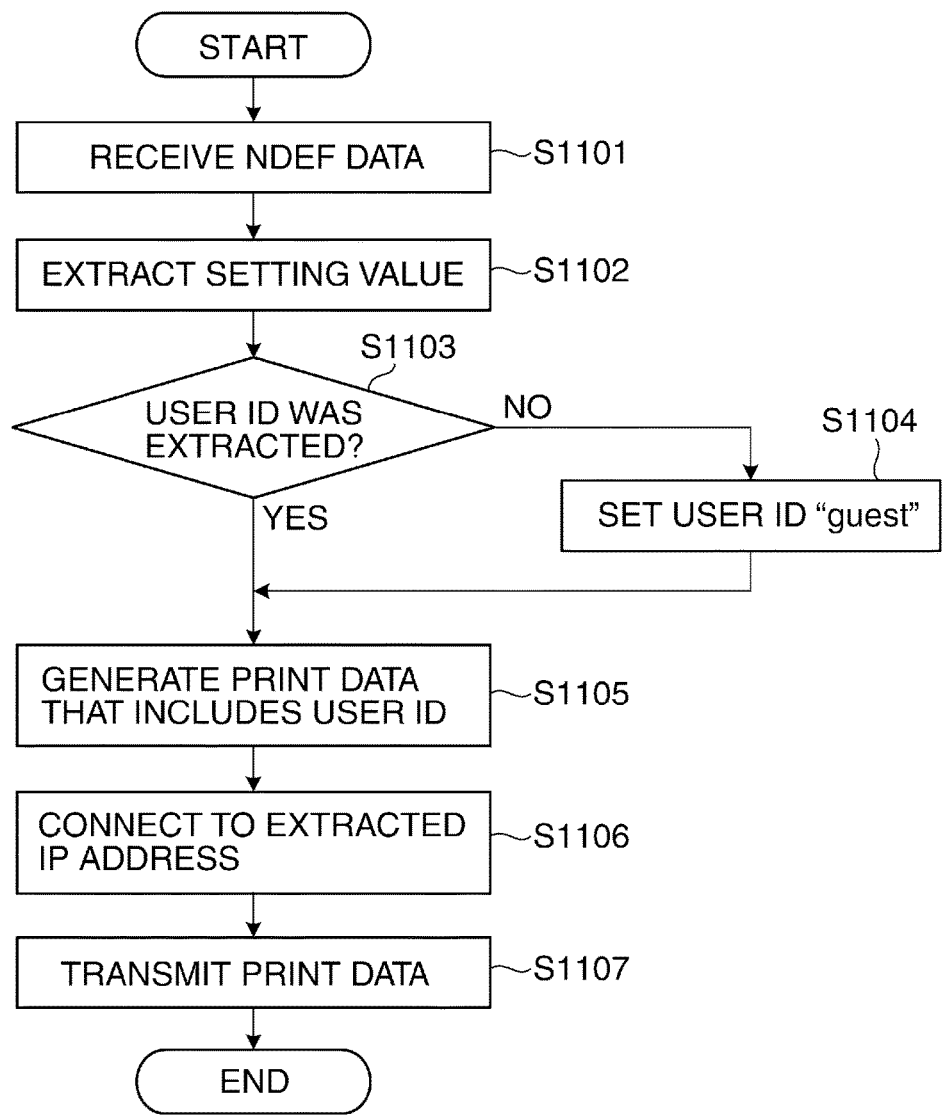
FIG. 11 is a flowchart showing a print data transmitting process executed by a print application shown in FIG. 5.

FIG. 11 is a flowchart showing a print data transmitting process executed by the application 505 of the portable terminal 102. The CPU 401 develops the program stored in a memory, such as the ROM 403 or the flash memory 404, to the RAM 402, and executes this process.

This process is executed by the application 505, when a user touches the NFC reader 407 of the portable terminal 102 to the NFC unit 211. First, when the user locates the portable terminal 102 in which the application 505 is installed within the communication area of the NFC control module 303 of the printing apparatus 100, the NFC control module 303 outputs the NDEF data 600 to the portable terminal 102 from the NFC unit 211. That is, the NFC reader 407 reads the NDEF data 600 from the NFC tag 101. At this time, the NFC control module 303 functions as an output unit of the present invention. Then, the application 505 receives the NDEF data 600 that the NFC reader 407 reads under the control by the NFC reader control module 504 (step S1101).

In the next step S1102, the application 505 analyzes the records in the received NDEF data 600, and extracts the stored setting values. The setting values shown in FIG. 6B are extracted in the first embodiment. Then, the application 505 determines whether a user ID was extracted in step S1103. As a result of the determination, when a user ID was not extracted, the application 505 sets a character string "guest" as a user ID in step S1104, and proceeds with the process to step S1105. On the other hand, when a user ID was extracted, the process directly proceeds to the step S1105. Next, in the step S1105, the application 505 generates the print data that includes the extracted user ID or the user ID set in the step S1104.

Figure 12:
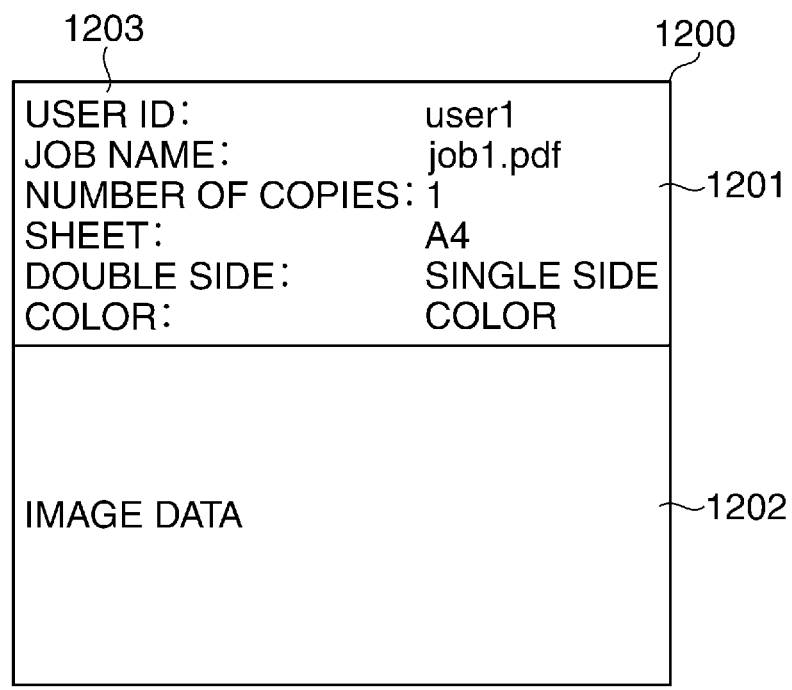
FIG. 12 is a view showing an example of print data that the print application shown in FIG. 5 generates.

FIG. 12 is a view showing an example of the print data that the print application 505 generates. This print data 1200 consists of a print setting part 1201 and an image data part 1202. Here, the value of the extracted user ID or the value of the user ID set in the step S1104 in FIG. 11 is set as an attribute 1203 indicating a user name.

In the next step S1106, the application 505 executes a process to connect to the IP address of the printing apparatus 100 in the extracted network information 612. Then, in step S1007, the application 505 transmits the print data 1200 from the wireless LAN I/F 406 to the printing apparatus 100 under the control by the LAN communication module 503. Then, the process in FIG. 11 finishes.

Figure 13:
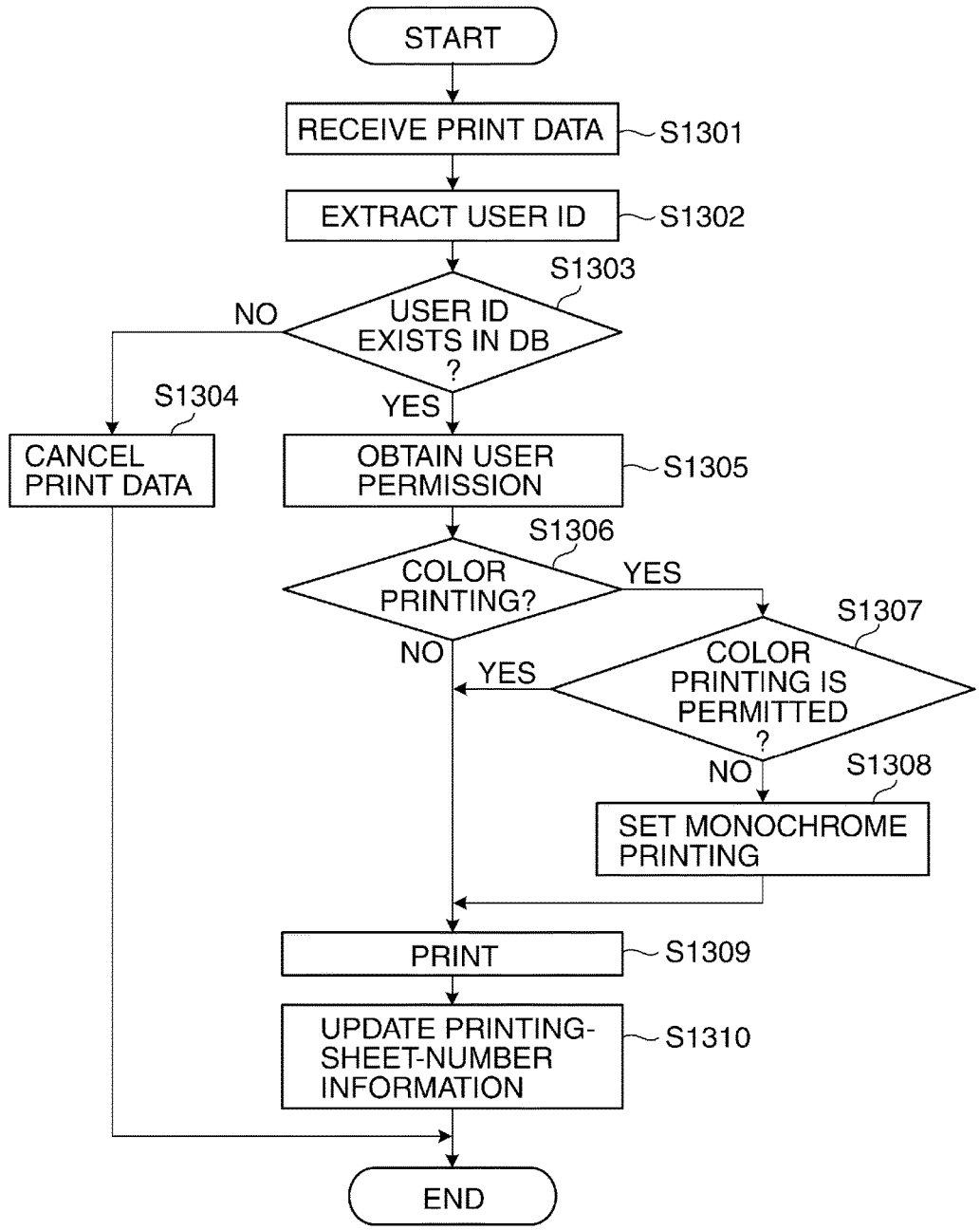
FIG. 13 is a flowchart showing a printing process executed by a print service shown in FIG. 3.

FIG. 13 is a flowchart showing a printing process executed by the print service 304. The CPU 202 develops the program stored in a memory, such as the ROM 204 or the HDD 205, to the RAM 203, and executes this process.

First, the print service 304 (hereinafter also referred to as "the service 304") receives the print data 1200 transmitted from the application 505 in the step S1107 in FIG. 11 (step S1301). At this time, the service 304 functions as a receiving unit of the present invention. Next, the service 304 extracts a user ID from the received print data 1200 (step S1302), and determines whether the extracted user ID exists in the authentication DB 700 (step S1303).

As a result of the determination, when the extracted user ID does not exist in the authentication DB 700 (FIG. 7A), the service 304 cancels the print data 1200 (step S1304), and terminates the process in FIG. 13. On the other hand, when the extracted user ID exists in the authentication DB 700, the service 304 obtains information about a user permission, i.e., the information about the function corresponding to the extracted user ID, with reference to the permission DB 710 (FIG. 7B) (step S1305).

Next, the print service 304 determines whether the print data 1200 designates color printing (step S1306). When the color printing is not designated, the process is proceeded to step S1309. On the other hand, when the color printing is designated, the service 304 determines whether the color printing is possible on the basis of the information obtained in the step S1305 (step S1307).

As a result of the determination, when the color printing is impossible, the service 304 sets to print the received print data 1200 concerned in monochrome (step S1308), and prints the print data 1200 in monochrome (step S1309). On the other hand, when the color printing is possible, the service 304 prints the print data 1200 in color (step S1309). Accordingly, in the step S1309, the printing process for the specific user is executed according to the extracted user ID. Then, the service 304 updates the printing-sheet-number information in the counter DB 720 (step S1310), and terminates the process in FIG. 13.

Thus, when a user was able to log in with the IC card or from the operation panel 213, the NFC control module 303 writes the user ID that specifies the login user into the NFC tag 101, and the portable terminal 102 reads it. Thereby, the portable terminal 102 is possible to give the user ID to the print data 1200. This enables the printing apparatus 100 to execute a process corresponding to a user without taking time for inputting authentication information again on the portable terminal 102 at the time of a print instruction.

Although a login user name itself is written into the NFC tag as a user ID in the first embodiment, an identifier related to the login user name may be generated temporarily and written into the NFC tag. In such a case, since the print data 1200 includes the identifier, the service 304 should execute a process to specify a user on the basis of the extracted identifier.

According to the first embodiment, when the authentication succeeds, the NDEF data 600 including a user ID is generated, and it is written into the NFC unit 211. When the portable terminal 102 is brought close to the NFC tag 101, the portable terminal 102 reads the NDEF data 600 from the NFC unit 211, and the application 505 generates the print data 1200 to which the user ID in the NDEF data 600 is added. Accordingly, the portable terminal 102 does not requires a user to input a user ID again at the time of execution of a print instruction. Accordingly, the time for inputting authentication information at the time of instructing job process from the portable terminal is saved.

Next, a second embodiment of the present invention will be described. In the first embodiment, the NFC control module 303 deletes the user ID from the NFC tag 101 at the timing when the user who logged in to the printing apparatus 100 logs out. However, if the user who logged in goes away from the printing apparatus 100 without logging out, the user ID remains in the NFC tag until timeout. In such a situation, another user may read the user ID of the previous user by holding a portable terminal over the NFC tag 101, and a printing process may be executed with the previous user permission.

Accordingly, the second embodiment of the present invention uses the human sensor 1402 (FIG. 2) and the human sensor control module 1501 (FIG. 3) that are mounted in the printing apparatus 100, and deletes a user ID from the NFC tag 101 at the timing when a user goes away from the printing apparatus 100. Thereby, even if a user goes away from the printing apparatus 100 without performing a logout operation, another user is prevented from reading the user ID of the previous user.

The second embodiment will be described with reference to FIG. 14 in addition to the description for the first embodiment. The other configurations are the same as that of the first embodiment.

The human sensor I/F 1401 shown in FIG. 2 connects the human sensor 1402 with the control unit 201. The human sensor 1402 is able to detect that a person entered in certain distance from the printing apparatus 100 and that a person exited from there. The human sensor control module 1501 shown in FIG. 3 receives the information about entrance and exit of a person detected by the human sensor 1402, and performs a process according to the information. In the second embodiment, when detecting that a person went away from the printing apparatus 100, the authentication control module 305 transmits a user information deletion request to the NFC control module 303.

Figure 14:
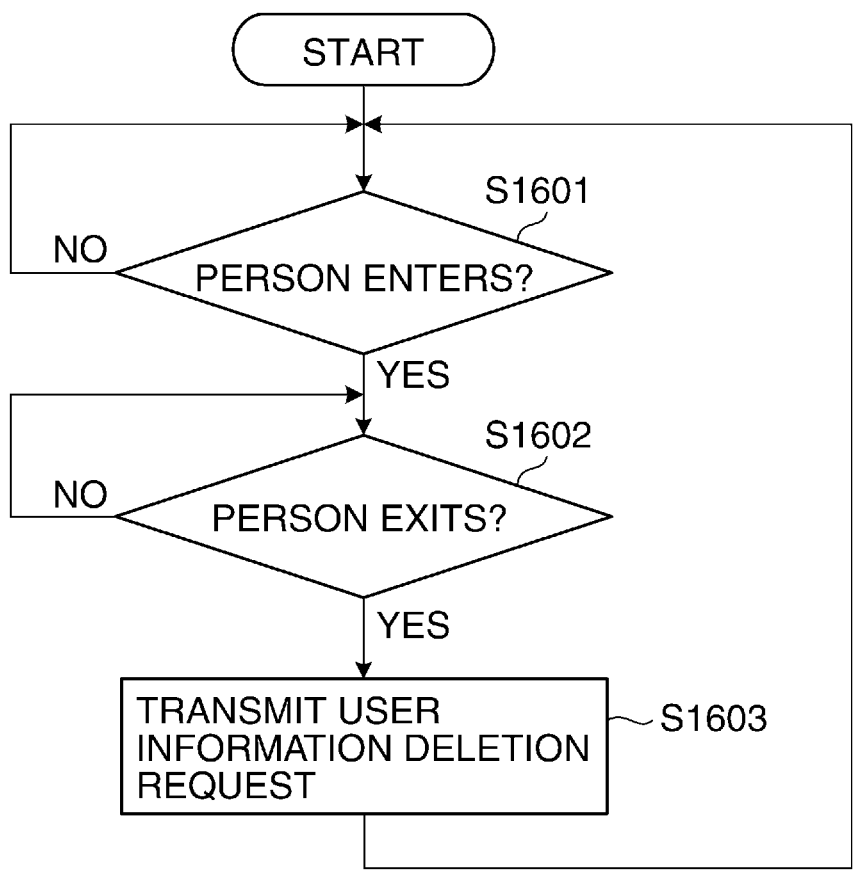
FIG. 14 is a flowchart showing a process executed by a human sensor control module of a printing apparatus according to a second embodiment of the present invention.

FIG. 14 is a flowchart showing a process executed by the human sensor control module 1501. The CPU 202 develops the program stored in a memory, such as the ROM 204 or the HDD 205, to the RAM 203, and executes this process.

First, the human sensor control module 1501 monitors the information from the human sensor 1402, and waits for entrance of a person into the certain distance from the printing apparatus 100 in step S1601. Then, when a person entered, the human sensor control module 1501 waits for an exit of the person from the certain distance from the printing apparatus 100 in step S1602. Then, when the person exited from the certain distance, the human sensor control module 1501 transmits a user information deletion request to the NFC control module 303 in step S1603, and returns the process to the step S1601. In this case, since the NFC control module 303 generates and writes the NDEF data 600 that does not include the user information 614 in the steps S1006 and S1005 in FIG. 10, the user ID is approximately deleted from the NFC tag 101.

It should be noted that the user information deletion request may be transmitted by the process of the human sensor control module 1501 in parallel to the transmission of the user information deletion request due to a logout operation or timeout.

According to the second embodiment, even if a user goes away from the printing apparatus 100 without a logout operation, another user cannot read the user ID, which exhibits the effect of improvements in security and convenience in addition to the effect of the first embodiment.

Next, a third embodiment of the present invention will be described. The third embodiment of the present invention applies an idea different from the second embodiment so that a user is prevented from reading a user ID of a previous user even if the previous user who logged in went away before timeout without performing a logout operation. That is, the third embodiment defines an allowable print count for a user who logged in, and deletes a user ID from the NFC tag 101 at the timing when the number of times of printing reaches the allowable print count.

The third embodiment will be described with reference to FIG. 15 and FIG. 16 in place of FIG. 9 and FIG. 13 that were used for describing the first embodiment. The other configurations are the same as that of the first embodiment.

Figure 15:
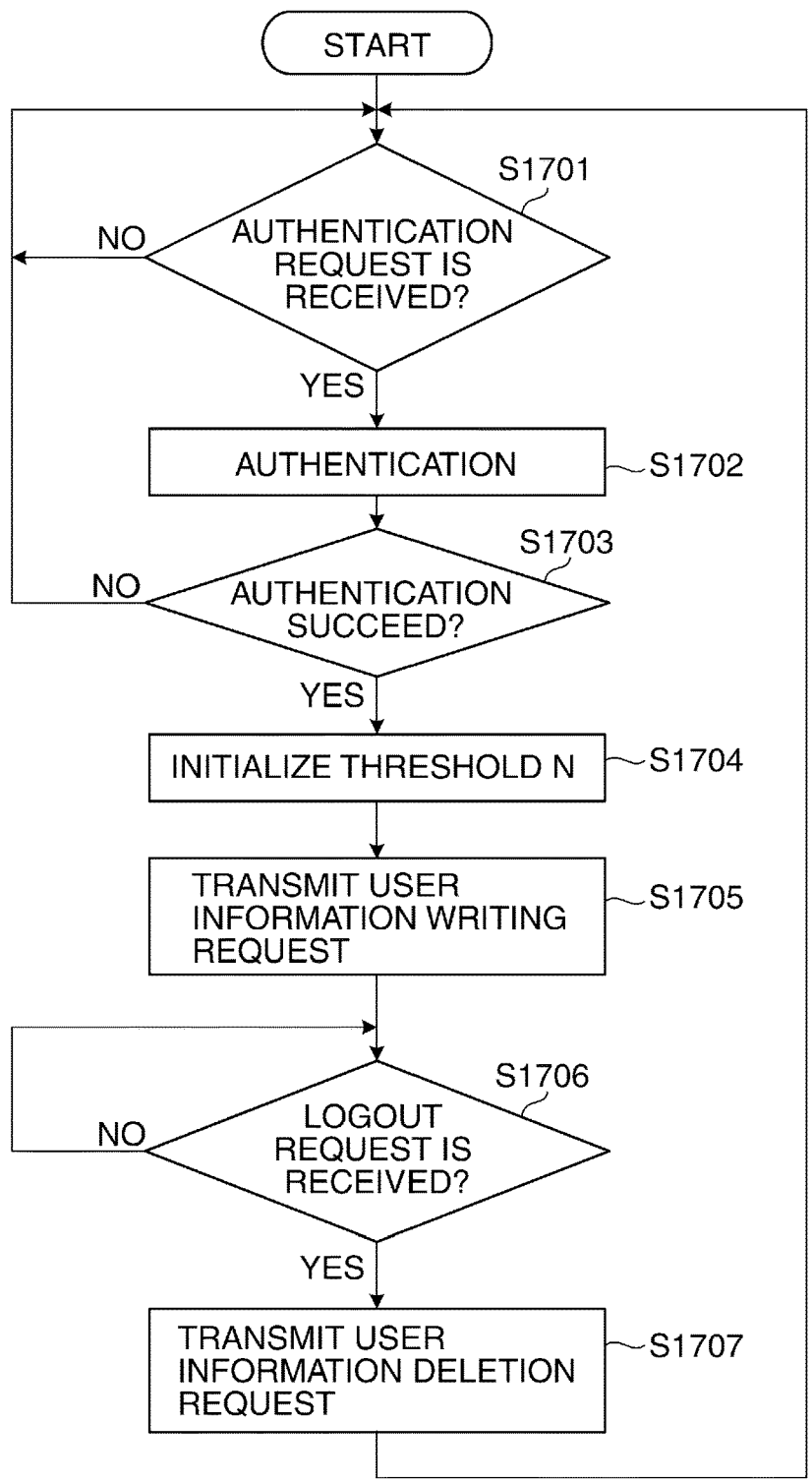
FIG. 15 is a flowchart showing an authentication process executed by an authentication control module of a printing apparatus according to a third embodiment of the present invention.

FIG. 15 is a flowchart showing an authentication process executed by the authentication control module 305. In steps S1701 through S1703, the authentication control module 305 executes the same process as the steps S901 through S903 in FIG. 9. In step S1704, the authentication control module 305 initializes the allowable print count N. Although an initial value of the allowable print count N is stored in the HDD 205, a user is able to change a value at the time of initialization through the operation panel 213. The allowable print count N is held in the RAM 203. The allowable print count N is referred by the print service 304 as mentioned below, and is initialized by the authentication control module 305 at every login. In the third embodiment, the allowable print count N defines the maximum number of times of printing. In steps S1705 through S1707, the authentication control module 305 executes the same process as the steps S904 through S906 in FIG. 9.

Figure 16:
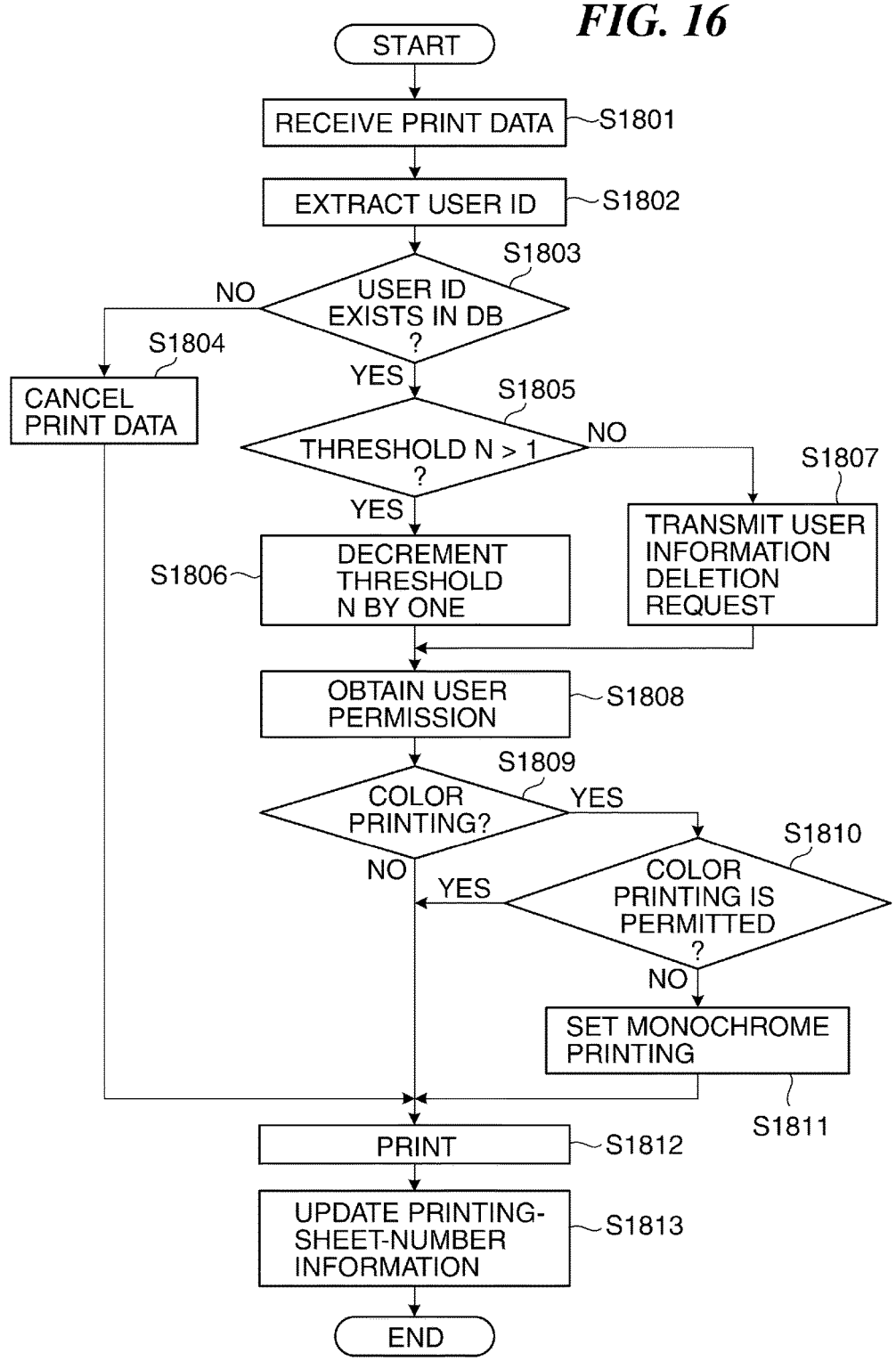
FIG. 16 is a flowchart showing a printing process executed by a print service of a printing apparatus according to the third embodiment of the present invention.

FIG. 16 is a flowchart showing a printing process executed by the print service 304. In steps S1801 through S1804, the service 304 executes the same process as the steps S1301 through S1304 in FIG. 13. In step S1805, the service 304 determines whether the allowable print count N held in the RAM 203 is larger than one (N>1). As a result of the determination, when the allowable print count N is larger than one, the service 304 decrements the allowable print count N by one (step S1806), and proceeds with the process to step S1808. On the other hand, when the allowable print count N is not larger than one, he service 304 transmits the user information deletion request to the NFC control module 303 (step S1807), and proceeds with the process to the step S1808. When the process in the step S1807 is executed, the NFC control module 303 generates and writes the NDEF data 600 that does not include the user information 614 in the steps S1006 and S1005 in FIG. 10. Accordingly, the user ID is approximately deleted from the NFC tag 101. In steps S1808 through S1813, the same process as the steps S1305 through S1310 in FIG. 13 is executed.

According to the third embodiment, when the number of times of printing after login reaches the allowable print count N, the user ID is deleted from the NFC tag 101. Accordingly, even if a user goes away from the printing apparatus 100 without a logout operation, another user cannot read the user ID, which exhibits the effect of an improvement in security in addition to the effect of the first embodiment.

It should be noted that the count N is set to "1" when the number of times of printing is always one time. However, in order to simplify the configuration, the process in the steps S1805 and S1806 may be abolished to execute the process in the step 1807 after the step S1803 and to proceed with the process to the step S1808.

It should be noted that the third embodiment may be combined with the second embodiment. That is, the process for transmitting the user information deletion request by the human sensor control module 1501 may be performed in parallel in the third embodiment.

Next, a fourth embodiment of the present invention will be described. In the first embodiment, the portable terminal 102 generates the print data 1200 by extracting the user ID from the NDEF data 600 received from the NFC unit 211. On the other hand, in the fourth embodiment of the present invention, the portable terminal 102 stores the user ID once obtained from the NFC unit 211 and the portable terminal 102 is constituted so as to use the stored user ID when generating print data after that. Accordingly, when a user once touches the NFC unit 211 with the portable terminal 102, printing becomes possible even if it does not touch after that. That is, a user is able to print even if the user does not go to the printing apparatus 100. The fourth embodiment will be described with reference to FIG. 17 in place of FIG. 11 that was used to describe the first embodiment, and FIG. 18.

Figure 17:
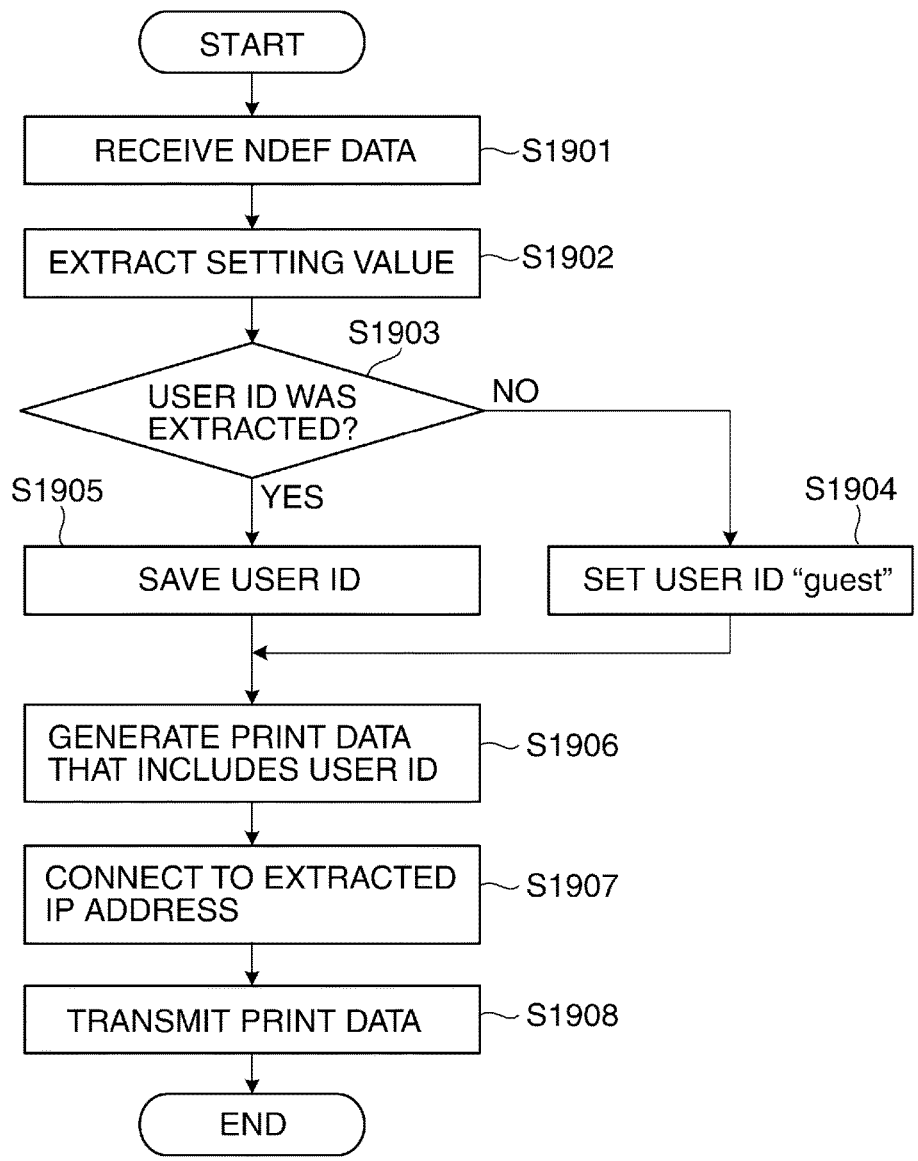
FIG. 17 is a flowchart showing a print data transmitting process executed by a print application of a portable terminal according to a fourth embodiment of the present invention.

FIG. 17 is a flowchart showing a print data transmitting process executed by the print application 505 of the portable terminal 102.

A process in steps S1901 through S1904 is the same as that in the steps S1101 through S1104 in FIG. 11. As a result of the determination in the step S1903, when the user ID is extracted from the NDEF data 600 received, the application 505 saves the extracted user ID in the RAM 402 or the flash memory 404 in the portable terminal 102 (step S1905). A process in steps S1906 through S1908 after that is the same as that in the steps S1105 through S1107 in FIG. 11.

Figure 18:
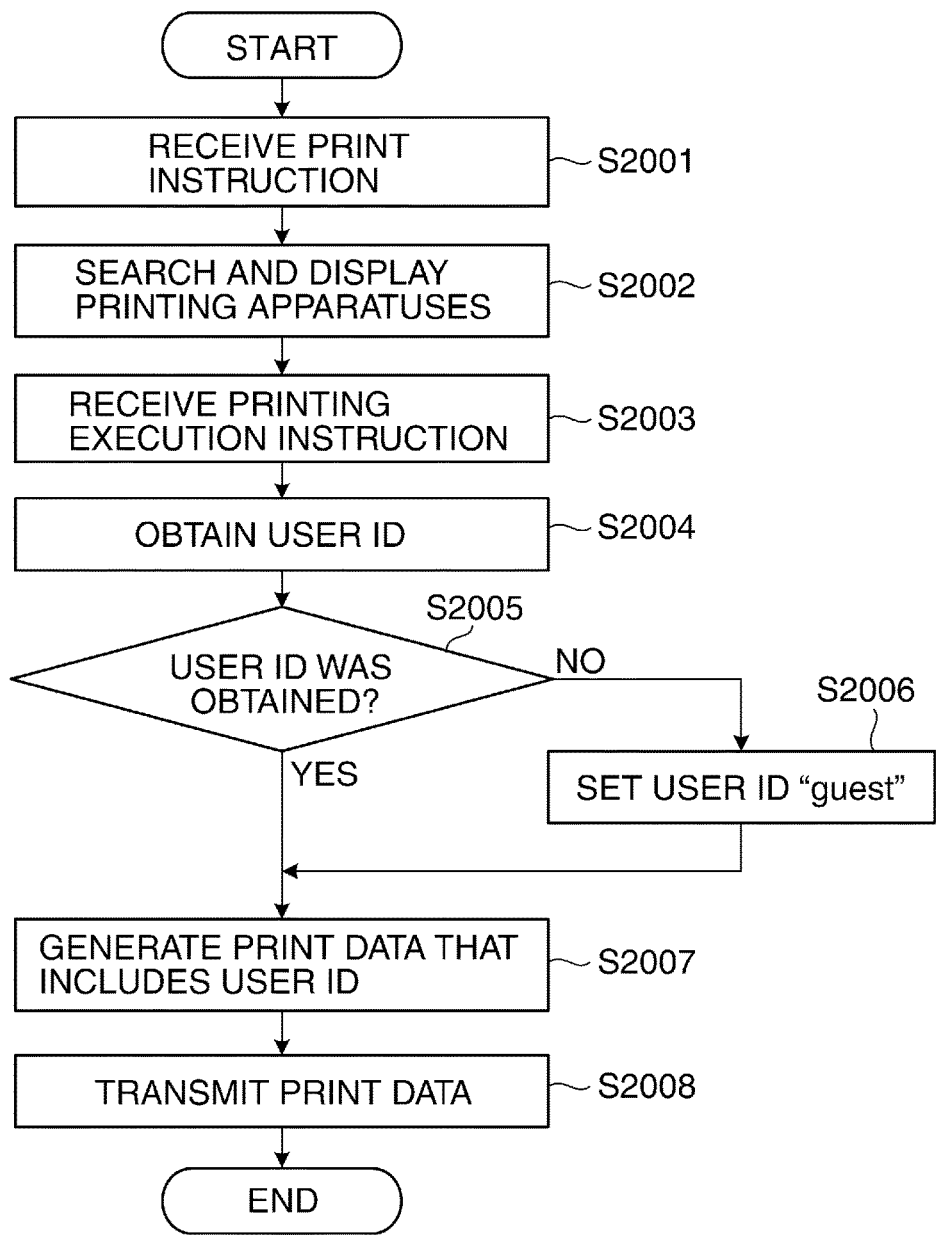
FIG. 18 is a flowchart showing a normal printing process executed by the print application of the portable terminal according to the fourth embodiment of the present invention.

FIG. 18 is a flowchart showing a normal printing process executed by the print application 505. The CPU 401 develops the program stored in the ROM 403 or the flash memory 404 to the RAM 402, and executes this process.

In a case of the normal printing process that does not use the NFC, the application 505 receives a normal print instruction from a user in step S2001. The print instruction is received when the user displays a print menu from the applications operating on the portable terminal 102 and executes the print instruction.

In the next step S2002, the application 505 searches for printing apparatuses connectable through the wireless LAN I/F 406, and displays a list of the searched printing apparatuses on the operation unit 405. In the next step S2003, the application 505 receives a printing execution instruction from the user. The printing execution instruction is performed when the user selects the specific printing apparatus from the displayed list of the printing apparatus. In the next step S2004, the application 505 obtains a user ID saved in the RAM 402 or the flash memory 404 in the step S1905 in FIG. 17.

Next, the application 505 determines whether a user ID was obtained (extracted) in step S2005. As a result of the determination, when a user ID was not extracted, the application 505 sets a character string "guest" as a user ID in the step S2006, and proceeds with the process to step S2007. On the other hand, when the user ID was obtained, the application 505 proceeds with the process to the step S2007.

In the step S2007, the application 505 generates the print data 1200 that includes the extracted user ID or the user ID set in the step S2006 (see FIG. 12). In the next step S2008, the application 505 transmits the print data 1200 to the selected printing apparatus. Then, the process in FIG. 18 finishes.

According to the fourth embodiment, when the user ID is obtained once from the NFC unit 211, the user ID is stored and is used for generating the subsequent print data 1200. Accordingly, when a user once touches with the NFC, printing becomes possible without touching with the NFC after that, which exhibits the effect of an improvement in convenience of a user in addition to the effect of the first embodiment.

It should be noted that the fourth embodiment may be applied to the second or third embodiment.

Next, a fifth embodiment of the present invention will be described. In the first embodiment, since the NDEF data 600 is updated, there are a case where the user information 614 is included and a case where the user information 614 is not included (FIG. 10). Accordingly, even after a user logged out, the portable terminal 102 can read the NDEF data 600, extract the network information about the printing apparatus 100, generate and transmit the print data 1200 to which "guest" is added as a user ID (FIG. 11). The fifth embodiment of the present invention is configured so that the NFC unit 211 does not hold NDEF data when a user is not in a login state. Accordingly, a user is certainly required to log in when the user instructs printing from the portable terminal 102. As a result, since the user ID of the user is certainly included in the print data, the printing apparatus 100 is able to always execute a process corresponding to a user. The fifth embodiment will be described with reference to FIG. 19 in place of FIG. 10 that was used for describing the first embodiment.

Figure 19:
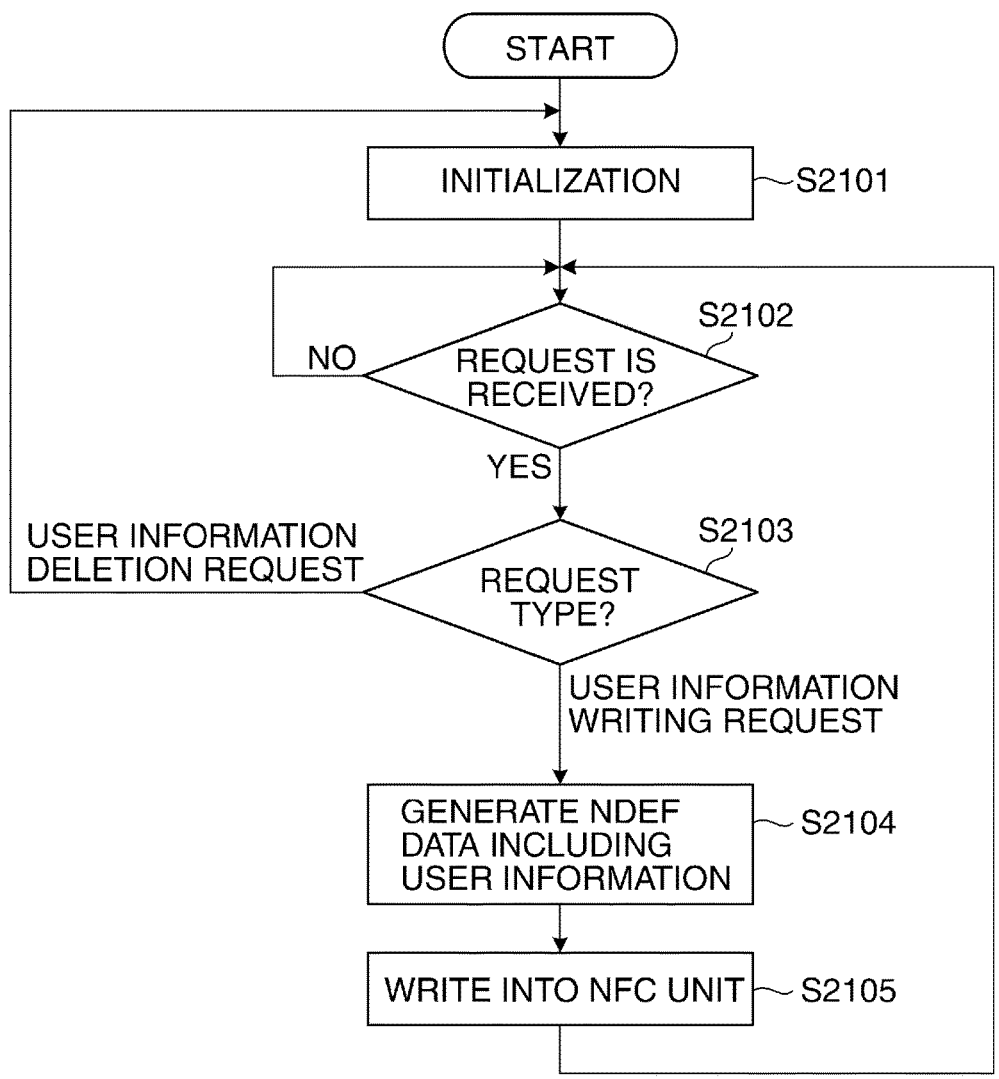
FIG. 19 is a flowchart showing an NDEF data writing process executed by an NFC control module of a printing apparatus according to the fourth embodiment of the present invention.

FIG. 19 is a flowchart showing an NDEF data writing process executed by the NFC control module 303.

When the printing apparatus 100 is started, the NFC control module 303 initializes the NFC unit 211 in step S2101. In an initial state, no user has logged in yet and nothing is written in the NFC unit 211. In the next step S2102, the NFC control module 303 executes the same process as the step S1002 in FIG. 10.

When receiving a request from the authentication control module 305, the NFC control module 303 determines the type of the request in step S2103. As a result of the determination, when the received request is a user information writing request from the authentication control module 305, the NFC control module 303 executes the same process as that in the steps S1004 and S1005 in FIG. 10 in steps S2104 and S2105. Namely, the NFC control module 303 generates the NDEF data 600, and writes it into the NFC unit 211.

On the other hand, as a result of the determination in the step S2103, when the received request is a user information deletion request from the authentication control module 305, the NFC control module 303 returns the process to the step S2101. Accordingly, the NDEF data 600 is not generated.

Thus, the NDEF data 600 is not generated unless authentication succeeds. when a user has not yet logged in or when a user logged out after login, the NFC unit 211 is in the state where the NDEF data 600 is not written in. In this state, even if a user touches the NFC unit 211 with the portable terminal 102, the NDEF data 600 is not read. Accordingly, a user is required to log in in order to print, and as a result, a user ID will be included in the print data 1200.

According to the fifth embodiment, a process corresponding to a user is always achieved when a printing process is executed in addition to the effect of the first embodiment.

It should be noted that the fifth embodiment may be applied to the third or fourth embodiment.

It should be noted that the first and fifth embodiments may be configured so that a user decides whether a user ID is actually included in the NDEF data 600 in the step S1004 in FIG. 10 and the step S2104 in FIG. 19. Moreover, the fourth embodiment may be configured so that a user decides whether the extracted user ID is actually stored into the RAM 402 or the flash memory 404 in the step S1905 in FIG. 17. Instructions of the decisions in these cases may be transmitted from the portable terminal 102 or may be received through the operation panel 213.

Although the NFC is exemplified as a short-range wireless communication system, the communication system is not limited to the NFC. The present invention is applicable also to a new method that will appear in the future.

Moreover, the print service is described as an example of s service using the NFC, and the print data is exemplified as job processing data. However, the present invention is not limited to these, may use another service of the printing apparatus 100. For example, scan instruction data may be used as the job processing data while applying a scan service.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-170569, filed Aug. 25, 2014, which is hereby incorporated by reference herein in its entirety.

What is claimed is:

1. A printing system comprising:
a printing apparatus; and
a portable terminal,
the printing apparatus comprising:
a near field communication (NFC) tag;
a storage device; and
a processor configured to execute computer executable instructions recorded on the storage device, the computer executable instructions including instructions, that when executed by the processor, cause the printing apparatus to:
acquire authentication information input via a card reader or via an operation unit of the printing apparatus;
execute user authentication based on the acquired authentication information;
write data that includes user information corresponding to the authentication information input via the card reader or via the operation unit into the NFC tag in a case where the user authentication based on the acquired authentication information succeeds;
output the data written in the NFC tag to the portable terminal via the NFC tag;
receive, from the portable terminal, print data including user identification information corresponding to the user information in the data output via the NFC tag; and
process the print data based on the user identification information included in the received print data; and
the portable terminal comprising:
a storage device; and
a processor configured to execute computer executable instructions recorded on the storage device, the computer executable instructions including instructions, that when executed by the processor, cause the portable terminal to:
read data written in the NFC tag from the NFC tag;
extract the user information from the read data;
generate print data using the extracted user information; and
transmit the generated print data to the printing apparatus.

2. A printing apparatus comprising:
a near field communication (NFC) tag;
a storage device; and
a processor configured to execute computer executable instructions recorded on the storage device, the computer executable instructions including instructions, that when executed by the processor, cause the printing apparatus to:
acquire authentication information input via a card reader or via an operation unit of the printing apparatus;
execute user authentication based on the acquired authentication information;
write data that includes user information corresponding to the authentication information input via the card reader or via the operation unit about a user whose authentication succeeds into the NFC tag in a case where the user authentication based on the acquired authentication information succeeds;
output the data written in the NFC tag to a portable terminal via the NFC tag;
receive, from the portable terminal, print data including user identification information corresponding to the user information in the data output via the NFC tag; and
process the print data based on the user identification information included in the received print data.

3. The printing apparatus according to claim 2, wherein the computer executable instructions include instructions, that when executed by the processor, cause the printing apparatus to write data that does not include user information into the NFC tag when a user logs out.

4. The printing apparatus according to claim 2, further comprising a human sensor,
wherein the computer executable instructions include instructions, that when executed by the processor, cause the printing apparatus to write data that does not include user information into the NFC tag when the human sensor detects that the user goes away from the printing apparatus.

5. The printing apparatus according to claim 2, wherein the computer executable instructions include instructions, that when executed by the processor, cause the printing apparatus to determine, based on the user information included in the received print data, whether to print according to the print data or to cancel the print data.

6. The printing apparatus according to claim 2, wherein the computer executable instructions include instructions, that when executed by the processor, cause the printing apparatus to determine, based on the user information included in the received print data, whether to permit color printing.

7. The printing apparatus according to claim 2, wherein the user information is a user name of the user whose authentication succeeds.

8. The printing apparatus according to claim 2, wherein the computer executable instructions include instructions, that when executed by the processor, cause the printing apparatus to not write data that includes user information about a user whose authentication does not succeed into the NFC tag when the user authentication does not succeed.

9. A portable terminal comprising:
a storage device; and
a processor configured to execute computer executable instructions recorded on the storage device, the computer executable instructions including instructions, that when executed by the processor, cause the portable terminal to:
read data in a near field communication (NFC) tag from the NFC tag, the read data including network information of a printing apparatus;
determine whether the data read from the NFC tag further includes user information;
generate print data including the user information in a case where it is determined that the read data further includes the user information in addition to the network information of the printing apparatus; and
transmit, based on the network information of the printing apparatus, the generated print data including the user information to the printing apparatus.

10. The portable terminal according to claim 9, wherein the computer executable instructions include instructions, that when executed by the processor, cause the portable terminal to generate the print data using a predetermined character string in a case where it is determined that the read data does not further include user information.

11. The portable terminal according to claim 9, wherein the computer executable instructions include instructions, that when executed by the processor, further cause the portable terminal to:
  store the user information concerned in a case where it is determined that the read data further includes the user information, and
  receive a print instruction from a user,
  wherein the print data is generated using the stored user information in a case where the print instruction is received from the user.

12. The portable terminal according to claim 9, wherein the user information is a user name.

13. A control method for a printing apparatus with a near field communication (NFC) tag, the control method comprising:
  acquiring authentication information input via a card reader or via an operation unit of the printing apparatus;
  executing user authentication based on the acquired authentication information;
  writing data that includes user information corresponding to the authentication information input via the card reader or via the operation unit about a user whose authentication succeeds into the NFC tag in a case where the user authentication based on the acquired authentication information succeeds;
  outputting the data written in the NFC tag to a portable terminal via the NFC tag;
  receiving, from the portable terminal, print data including user identification information corresponding to the user information in the data output via the NFC tag; and
  processing the print data based on the user identification information included in the received print data.

14. A non-transitory computer-readable storage medium storing a control program causing a computer to execute a control method for a printing apparatus with a near field communication (NFC) tag, the control method comprising:
  acquiring authentication information input via a card reader or via an operation unit of the printing apparatus;
  executing user authentication based on the acquired authentication information;
  writing data that includes user information corresponding to the authentication information input via the card reader or via the operation unit about a user whose authentication succeeds into the NFC tag in a case where the user authentication based on the acquired authentication information succeeds;
  outputting the data written in the NFC tag to a portable terminal via the NFC tag;
  receiving, from the portable terminal, print data including user identification information corresponding to the user information in the data output via the NFC tag; and
  processing the print data based on the user identification information included in the received print data.

15. A control method for a portable terminal, the control method comprising:
  reading data in a near field communication (NFC) tag from the NFC tag, the read data including network information of a printing apparatus;
  determining whether the data read from the NFC tag further includes user information;
  generating print data including the user information in a case where it is determined that the read data further includes the user information in addition to the network information of the printing apparatus; and
  transmitting, based on the network information of the printing apparatus, the generated print data including the user information to the printing apparatus.

16. The control method for a portable terminal according to claim 15, wherein the print data is generated using a predetermined character string in a case where it is determined that the read data does not further include user information.

17. The control method for a portable terminal according to claim 15, further comprising:
  storing the user information concerned in a case where it is determined that the read data further includes the user information, and
  receiving a print instruction from a user,
  wherein the print data is generated using the stored user information in a case where the print instruction is received from the user.

18. The control method for a portable terminal according to claim 15, wherein the user information is a user name.

19. A non-transitory computer-readable storage medium storing a control program causing a computer to execute a control method for a portable terminal, the control method comprising:
  reading data in a near field communication (NFC) tag from the NFC tag, the read data including network information of a printing apparatus;
  determining whether the data read from the NFC tag further includes user information;
  generating print data including the user information in a case where it is determined that the read data further includes the user information in addition to the network information of the printing apparatus; and
  transmitting, based on the network information of the printing apparatus, the generated print data including the user information to the printing apparatus.

* * * * *